United States Patent
Yoshikawa

(10) Patent No.: US 8,947,191 B2
(45) Date of Patent: Feb. 3, 2015

(54) REACTOR

(75) Inventor: Kouhei Yoshikawa, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 13/983,886

(22) PCT Filed: Feb. 9, 2012

(86) PCT No.: PCT/JP2012/052972
§ 371 (c)(1),
(2), (4) Date: Aug. 6, 2013

(87) PCT Pub. No.: WO2012/114890
PCT Pub. Date: Aug. 30, 2012

(65) Prior Publication Data
US 2013/0314964 A1 Nov. 28, 2013

(30) Foreign Application Priority Data

Feb. 25, 2011 (JP) .................................. 2011-039558
Dec. 27, 2011 (JP) .................................. 2011-285717

(51) Int. Cl.
*H01F 17/04* (2006.01)
*H01F 27/24* (2006.01)
(Continued)

(52) U.S. Cl.
CPC .............. *H01F 27/402* (2013.01); *H01F 37/00* (2013.01); *G05F 1/618* (2013.01); *H02M 7/44* (2013.01); *H01F 2027/406* (2013.01)
USPC .............. 336/221; 336/212; 336/208; 336/90

(58) Field of Classification Search
USPC ........... 336/212, 221, 90, 198, 208, 147, 145, 336/182, 179
See application file for complete search history.

(56) References Cited

U.S. PATENT DOCUMENTS 4,112,405 A * 9/1978 Joseph .............................. 337/4
4,405,913 A * 9/1983 Finkbeiner ...................... 336/98
(Continued)

FOREIGN PATENT DOCUMENTS

JP     57-8725     1/1982
JP     58-2040     1/1983
(Continued)

OTHER PUBLICATIONS

International Search Report in International Application No. PCT/JP2012/052972 dated May 15, 2012.

*Primary Examiner* — Mangtin Lian
(74) *Attorney, Agent, or Firm* — Venable LLP; Michael A. Sartori; F. Brock Riggs

(57) ABSTRACT

A small reactor capable of appropriately measuring the temperature of a coil is provided. The reactor includes a coil 2 including a pair of coil elements 2a and 2b and a magnetic core including a pair of inner core portions 31 disposed in the respective coil elements 2a and 2b and outer core portions that connect the inner core portions 31 to form a closed magnetic circuit. Each of the coil elements 2a and 2b has an end face shape having a rounded corner portion 21, which is a corner portion of a rectangle that is rounded. A temperature sensor 7 is disposed in a trapezoidal space between the rounded corner portions 21 of the coil elements 2a and 2b that face each other. The temperature sensor 7 is pressed so as to contact the rounded corner portions 21 by the sensor holder portion 54 provided on an insulator, and is capable of appropriately measuring the temperature of the coil 2. When the temperature sensor 7 is disposed in a region in which the inner core portions 31 are not disposed in the respective coil elements 2a and 2b, the coil elements 2a and 2b can be positioned near each other and the size of the reactor can be reduced.

8 Claims, 7 Drawing Sheets

(51) Int. Cl.
*H01F 27/30* (2006.01)
*H01F 27/02* (2006.01)
*H01F 27/40* (2006.01)
*H01F 37/00* (2006.01)
*G05F 1/618* (2006.01)
*H02M 7/44* (2006.01)

(56) References Cited

U.S. PATENT DOCUMENTS

| | | | | |
|---|---|---|---|---|
| 4,454,554 A | * | 6/1984 | Coleman | 361/41 |
| 4,842,100 A | * | 6/1989 | Cameron et al. | 184/6.2 |
| 2009/0009920 A1 | * | 1/2009 | Yamada | 361/93.1 |
| 2009/0279337 A1 | * | 11/2009 | Hamatani | 363/132 |
| 2011/0156853 A1 | * | 6/2011 | Kato et al. | 336/192 |

FOREIGN PATENT DOCUMENTS

| | | |
|---|---|---|
| JP | 4-65423 | 6/1992 |
| JP | 2004-119609 | 4/2004 |
| JP | 2004-319679 | 11/2004 |
| JP | 2007-173702 | 7/2007 |
| JP | 2010-186766 | 8/2010 |
| JP | 2010-203998 | 9/2010 |
| JP | 2010-245458 | 10/2010 |
| WO | WO 2010021113 A1 * | 2/2010 |

* cited by examiner

REACTOR

TECHNICAL FIELD

The present invention relates to a reactor for use as a component of a power conversion device, such as an on-vehicle DC-DC converter mounted in a vehicle, such as a hybrid vehicle, a converter including the reactor, and a power conversion device including the converter. More particularly, the present invention relates to a small reactor capable of appropriately measuring a temperature of a coil.

BACKGROUND ART

A reactor is one of components of a circuit that performs an operation of increasing or reducing a voltage. For example, Patent Literature (PTL) 1 discloses a reactor included in a converter mounted in a vehicle, such as a hybrid vehicle. The reactor includes, for example, a coil, a ring-shaped magnetic core, a case, and sealing resin (secondary resin part). The coil includes a pair of coil elements that are arranged next to each other. The magnetic core includes a pair of pillar-shaped inner core portions (coil winding portions) that are inserted through the respective coil elements, and outer core portions (end cores) that connect the inner core portions, which are arranged parallel to each other, to form a closed magnetic circuit. The case houses an assembly of the coil and the magnetic core, and is filled with the sealing resin. According to PTL 1, the outer peripheral surface of each coil element, which has rectangular end faces, is covered with resin so that each coil element is formed as an independent body. The coil elements are connected to each other at one end thereof with a connecting conductor to form a single coil.

When the coil receives electricity and generates heat, the loss of the reactor increases owing to the generated heat. Therefore, in general, the reactor is used while being fixed to a cooling base so that the coil can be cooled. An operation of measuring the temperature of the coil and controlling a current applied to the coil in accordance with the temperature has also been studied. According to PTL 1, attachment grooves for receiving a temperature sensor are formed in surfaces of the bodies that oppose each other (opposing surfaces). The bodies are disposed near each other so that a columnar hole in which the temperature sensor can be inserted is formed by the attachment grooves. The attachment grooves extend in a direction orthogonal to both the direction in which the coil elements are arranged next to each other and an axial direction of the coil elements. The attachment grooves are formed so as to extend linearly over the entire length of the respective opposing surfaces from an edge at the bottom surface side of the case to the other edge (opposite edge) at the open side of the case.

CITATION LIST

Patent Literature

PTL 1: Japanese Unexamined Patent Application Publication No. 2010-245458

SUMMARY OF INVENTION

Technical Problem

Recently, there has been a demand for a further reduction in the size of components mounted in vehicles, such as a hybrid vehicle. However, it is difficult to further reduce the size of the reactor according to the related art.

In the reactor having the above-described attachment grooves, it is necessary to form a gap, which at least corresponds to the thickness of the temperature sensor, between the opposing surfaces of the coil elements.

If the size of the gap is substantially equal to the thickness of the temperature sensor, there is a risk that the temperature sensor will break by being pressed by the coil elements that have expanded due to the generated heat. If the temperature sensor breaks, the temperature cannot be appropriately measured. In particular, in a region where the inner core portions are disposed in the space between the coil elements, there is substantially no space for absorbing the thermal expansion of the coil elements, and the pressing force caused by the thermal expansion of the coil elements is easily applied to the temperature sensor. Therefore, to reduce the stress (pressing force of the coil elements) applied to the temperature sensor, or, preferably, to substantially eliminate the stress, it is necessary to increase the size of the above-described gap. When the gap is provided as described above to prevent the temperature sensor from breaking, it is difficult to reduce the size owing to the gap.

Accordingly, an object of the present invention is to provide a small reactor capable of appropriately measuring the temperature of a coil.

Solution to Problem

According to the present invention, the above-described object is achieved by forming each coil element in a specific shape and placing the temperature sensor at a specific position.

The reactor according to the present invention includes a coil including a pair of coil elements and a magnetic core including a pair of inner core portions disposed in the respective coil elements and outer core portions that connect the inner core portions to form a closed magnetic circuit. Each of the coil elements is a tubular body formed by helically winding a wire and has an end face shape having a rounded corner portion, which is a corner portion that is rounded. The coil elements are arranged next to each other so that axes of the coil elements are parallel to each other. In the reactor according to the present invention, a temperature sensor is disposed in a trapezoidal space between the rounded corner portions of the coil elements that face each other.

A temperature distribution of the coil elements between installation-side surfaces of the coil elements (surfaces adjacent to the bottom surface of a case) to opposite surfaces at a side opposite the installation-side surfaces (surfaces adjacent to an opening of the case) was measured while the reactor was placed on a cooling base. As a result, the temperature was sufficiently low at the installation-side surfaces and in regions around the installation-side surfaces, and increased as the distance from the installation-side surfaces increased. Here, the dimension of the coil elements in a direction from the opposite surfaces to the installation-side surfaces (direction orthogonal to both the direction in which the coil elements are arranged next to each other and the axial direction of the coil elements; hereinafter referred to as a depth direction) is defined as a height of the coil elements. The temperature difference between the opposite surfaces and regions separated from the opposite surfaces by about ½ of the height of the coil elements in the depth direction was 2° C. or less. Accordingly, it can be said that the temperature of the coil can be appropriately measured when the temperature sensor is disposed on or near the opposite surfaces of the coil elements, that is, in the trapezoidal space between the rounded corner portions.

Even when the coil elements are arranged next to each other such that the regions in which the inner core portions are disposed in the coil elements are near each other, the above-described trapezoidal space may be provided as a sufficiently large space that corresponds to the rounding radius. Therefore, the temperature sensor can be reliably arranged. In other words, when the temperature sensor is disposed in the trapezoidal space, the distance between the regions in which the inner core portions are disposed in the coil elements can be made smaller than the thickness of the temperature sensor. The above-described trapezoidal space is a dead space that is necessarily formed since the wire is wound so as to form the rounded corner portions, and the size of the reactor is substantially not increased owing to the formation of the above-described space.

The trapezoidal space between the rounded corner portions includes a region in which the inner core portions are not disposed in the space between the coil elements. Therefore, when the temperature sensor is disposed in this space, the stress applied to the temperature sensor owing to the coil elements can be reduced, or preferably substantially eliminated.

Accordingly, the reactor according to the present invention is capable of appropriately measuring the temperature of the coil with the temperature sensor disposed in the trapezoidal space, and is small.

According to an embodiment of the present invention, an insulator may be further included, the insulator being interposed between the coil and the magnetic core. The insulator may include a sensor holder portion that projects toward the trapezoidal space and presses the temperature sensor against the coil so that the temperature sensor contacts the rounded corner portion.

In this embodiment, since the insulator is provided, electrical insulation between the coil and the magnetic core can be increased. In addition, the sensor holder portion causes the temperature sensor to reliably contact the coil. Therefore, in this embodiment, the temperature of the coil can be measured by the temperature sensor that is in direct contact with the coil, and the reliability of the measured temperature is high. Although the sensor holder portion is disposed near the coil, no electrical problem occurs even when the sensor holder portion contacts the coil since the sensor holder portion is formed of an insulating material.

According to an embodiment of the present invention, at least one hook portion on which a wire connected to the temperature sensor is hooked and a case that houses an assembly of the coil and the magnetic core may be further included. At least one of the at least one hook portion may be formed integrally with the case.

In this embodiment, since the case is provided, the assembly can be provided with protection from the external environment and mechanical protection. In particular, when a bottom portion of the case that is in contact with or near the assembly is made of a metal material, the bottom portion can be used as a heat dissipation path, and the heat dissipation performance can be increased. In addition, in this embodiment, the wire can be fixed to the case and the position of the wire can be regulated by hooking the wire on the hook portion after the temperature sensor is disposed in the trapezoidal space. Therefore, the possibility that the temperature sensor will be damaged owing to improper routing of the wire can be reduced. In addition, according to this embodiment, in the case where sealing resin is provided, the sealing resin can be easily injected without being impeded by the wire. In particular, when a side wall portion of the case that is arranged so as to surround the periphery of the assembly is formed of a resin, the hook portion can be easily formed integrally with the side wall portion by, for example, injection molding. In this case, the reactor can be easily produced.

According to an embodiment of the present invention, an insulator interposed between the coil and the magnetic core and at least one hook portion on which a wire connected to the temperature sensor is hooked may be further included. The at least one of the at least one hook portion may be formed integrally with the insulator.

Also in this embodiment, since the insulator is provided, the electrical insulation between the coil and the magnetic core can be increased as described above. In addition, sine the hook portion is provided, similar to the above-described embodiment in which the hook portion is integrated with the case, the position of the wire can be regulated. Therefore, advantages that the temperature sensor is not easily damaged and the sealing resin can be easily injected can be achieved. In addition, in the case where the insulator is manufactured by, for example, injection molding using an insulating resin, the hook portion can be easily formed integrally with the insulator. Therefore, also in this case, the reactor can be easily produced. The reactor according to the present invention may either be configured such that the hook portion is provided integrally with only the side wall portion of the case, with only the insulator, or with each of the side wall portion and the insulator.

According to an embodiment of the present invention, the temperature sensor may be disposed in a region of the trapezoidal space, the region being surrounded by the rounded corner portions and a tangent line of the inner core portions inserted through the respective coil elements.

In this embodiment, the temperature sensor is disposed in a region between the coil elements in which the inner core portions are not disposed. Therefore, the temperature sensor is substantially prevented from being damaged by the pressure applied as a result of thermal expansion of the coil, and the temperature of the coil can be appropriately measured. The above-described trapezoidal space may be set as a region in which the inner core portions are not disposed by adjusting, for example, the degree to which the rounded corner portions are rounded and the size and arrangement of the inner core portions.

According to an embodiment of the present invention, the case may include a bottom plate portion on which the assembly of the coil and the magnetic core is placed and a side wall portion that is independent of the bottom plate portion and integrated with the bottom plate portion with a fixing member so as to surround the periphery of the assembly. This embodiment is hereinafter referred to as an embodiment in which the case is dividable.

Since the bottom plate portion and the side wall portion are separate components, they can be separately manufactured. Therefore, in this embodiment, there is a high degree of freedom for manufacturing. For example, the bottom plate portion and the side wall portion may, for example, be made of different materials. When, for example, the side wall portion is made of an insulating material, such as a resin, the coil can be disposed near the side wall portion. Thus, the size of the reactor can be reduced. When, for example, the bottom plate portion is made of a metal material, such as aluminum, the heat of the coil can be easily dissipated. Thus, the heat dissipation performance of the reactor can be increased. The side wall portion and the bottom plate portion can be integrated together after the assembly of the coil and the magnetic core is placed on the bottom plate portion. Therefore, the reactor can be easily assembled.

In the embodiment in which the case is dividable, a bonding layer for securing the coil may be provided on a surface of the bottom plate portion.

In this embodiment, only the bonding layer is interposed between the coil and the bottom plate portion. Therefore, the distance between the bottom surface of the case and the coil is small, and the size of the reactor can be reduced. In addition, in this embodiment, the coil is secured to the bottom plate portion by the bonding layer. Therefore, the coil can be disposed in the case at a predetermined position irrespective of whether or not the sealing resin is provided. In addition, since the bottom plate portion and the side wall portion are separate components, the bonding layer can be formed while the side wall portion is separated from the bottom plate portion. Thus, in this embodiment, the bonding layer can be easily formed and work efficiency is high.

In the embodiment in which the case is dividable and the bonding layer is provided, the bonding layer may have a multilayer structure including a heat dissipation layer and an adhesive layer made of an insulating adhesive, and the bottom plate portion may be made of a conductive material. The adhesive layer is arranged so as to be in contact with the coil, and the heat dissipation layer is arranged so as to be in contact with the bottom plate portion.

In this embodiment, the coil can be reliably fixed to the bottom plate portion with the adhesive layer, and the heat of the coil can be efficiently transmitted to a fixation object, such as a cooling base, through the heat dissipation layer formed at the bottom-plate-portion side. Therefore, according to this embodiment, the heat dissipation performance can be increased irrespective of whether or not the sealing resin is provided, or irrespective of the material of the sealing resin. In addition, since the adhesive layer, which contacts the coil, is made of an insulating material, the coil and the bottom plate portion can be insulated from each other even when the heat dissipation layer and the bottom plate portion are made of a conductive material. Therefore, the thickness of the bonding layer including the heat dissipation layer can be reduced. Accordingly, in this embodiment, the heat dissipation performance can be increased and the size can be reduced. In addition, since the bottom plate portion is made of a conductive material (generally a metal material, such as aluminum, having a high thermal conductivity), the heat of the coil can be efficiently transmitted from the heat dissipation layer to the fixation object through the bottom plate portion. This is another reason why the heat dissipation performance can be increased in this embodiment.

At least a part of the bonding layer may be made of a material having a thermal conductivity of more than 2 W/m·K.

When the entire body of the bonding layer or a part (for example, the above-described heat dissipation layer) of the bonding layer is made of a material having a high thermal conductivity as described above, the heat dissipation performance of the reactor can be further increased. In addition, since the heat dissipation performance can be increased, the thickness of the bonding layer can be reduced. In other words, the distance between the coil and the bottom plate portion (fixation object) can be reduced. This is another reason why the heat dissipation performance can be increased and the size of the reactor can be reduced.

In the embodiment in which the bonding layer has the multilayer structure including the adhesive layer and the heat dissipation layer, the heat dissipation layer may be made of an epoxy-based adhesive containing alumina filler and the bottom plate portion may be made of aluminum or an aluminum alloy.

In this embodiment, a heat dissipation path including the heat dissipation layer and the bottom plate portion is provided, so that the heat dissipation performance can be increased. In addition, in this embodiment, the heat dissipation layer is made of an insulating adhesive, so that insulation between the bottom plate portion and the coil can be increased and the thickness of the heat dissipation layer can be reduced. Accordingly, the heat dissipation performance can be increased and the size can be reduced.

In the embodiment in which the case is dividable, the side wall portion may be made of an insulating material.

Since the side wall portion is made of an insulating material, the side wall portion and the coil are insulated from each other. Therefore, the distance between the inner surface of the side wall portion and the outer peripheral surface of the coil can be reduced as described above, and the size can be further reduced. When the insulating material is a material lighter than a metal material, such as a resin, the weight of the case can be reduced compared to that of an aluminum case according to the related art. Thus, the weight of the reactor can be reduced. In addition, when the insulating material is a resin, the hook portion can be easily formed as described above.

In the embodiment in which the case is dividable, the thermal conductivity of the bottom plate portion may be higher than or equivalent to the thermal conductivity of the side wall portion.

When the bottom plate portion on which the coil is placed has a high heat dissipation performance, the heat of the coil can be efficiently transmitted to the fixation object through the bottom plate portion. Thus, in this embodiment, the heat dissipation performance can be increased.

The reactor according to the present invention is suitable for use as a component of a converter. A converter according to the present invention includes a switching element, a drive circuit that controls an operation of the switching element, and a reactor that makes the switching operation smooth, the converter converting an input voltage by the operation of the switching element. The reactor is the reactor according to the present invention. The converter according to the present invention is suitable for use as a component of a power conversion device. A power conversion device according to the present invention includes a converter a converter that converts an input voltage, an inverter that is connected to the converter and performs conversion between a direct current and an alternating current, the power conversion device driving a load with electric power obtained as a result of the conversion performed by the inverter. The converter is the converter according to the present invention.

The converter of the present invention and the power conversion device of the present invention includes the reactor of the present invention, so that the temperature of the coil can be appropriately measured. Accordingly, a control operation can be appropriately performed in accordance with the temperature.

Advantageous Effects of Invention

The reactor according to the present invention is small and capable of appropriately measuring the temperature of the coil.

DESCRIPTION OF EMBODIMENTS

First Embodiment

Figure 1:
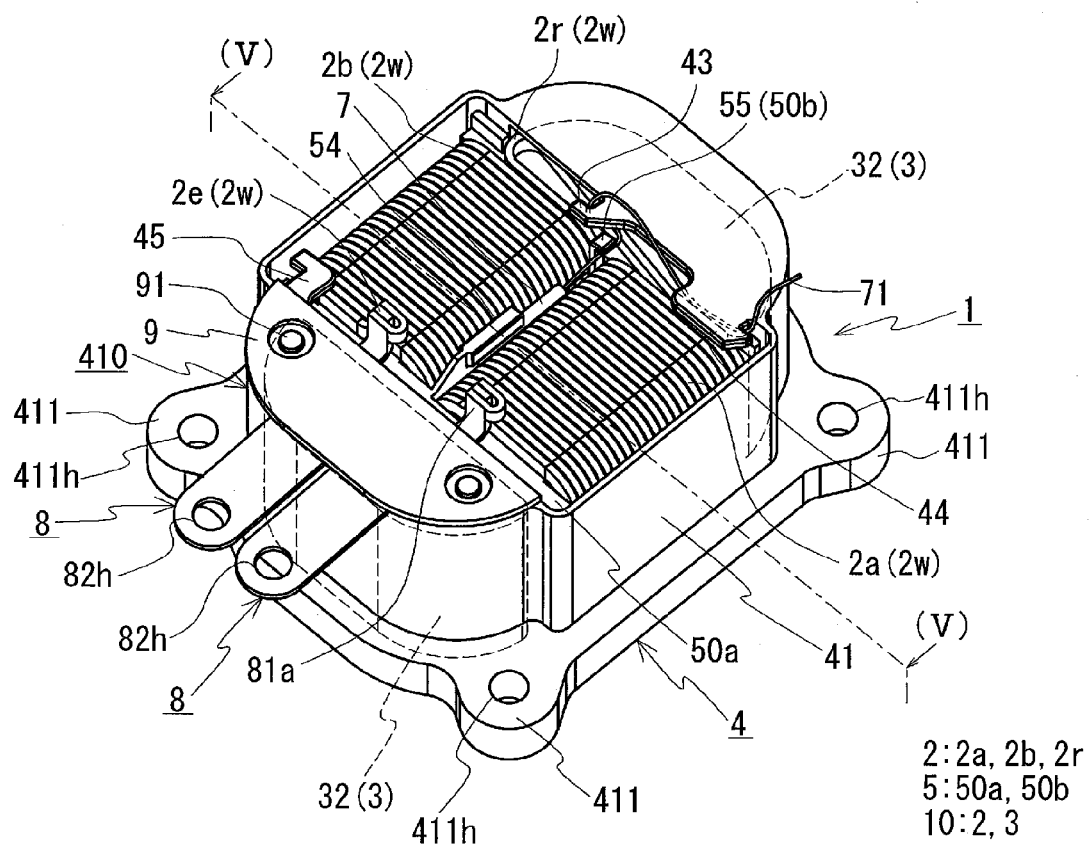
FIG. 1 is a schematic perspective view of a reactor according to a first embodiment.

A reactor 1 according to a first embodiment of the present invention will now be described with reference to FIGS. 1 to 5. In the figures, the same reference symbols denote components having the same names. In the following description, an installation side at which the reactor is installed is referred to as a bottom side, and the side opposite thereto is referred to as a top side.

<<Overall Structure of Reactor>>

The reactor 1 includes a coil 2 including a pair of coil elements 2a and 2b; a magnetic core 3 including a pair of inner core portions 31 (FIG. 3) disposed in the respective coil elements 2a and 2b and outer core portions 32 that connect the inner core portions 31 to form a closed magnetic circuit; and a temperature sensor 7 that measures the temperature of the coil 2. The reactor 1 of this example further includes a case 4 that houses an assembly 10 of the coil 2 and the magnetic core 3 and an insulator 5 interposed between the coil 2 and the magnetic core 3. The case 4 is a box-shaped member that is open at one side thereof. The insulator 5 includes hollow tubular portions 51 and frame bodies (frame plate portions 52) (see FIG. 4). The most characteristic features of the reactor 1 are the shape of each of the coil elements 2a and 2b and the position at which the temperature sensor 7 is disposed. In the following description, the characteristic features will be explained first, and then other structures will be explained in detail.

[Coil]

Figure 3:
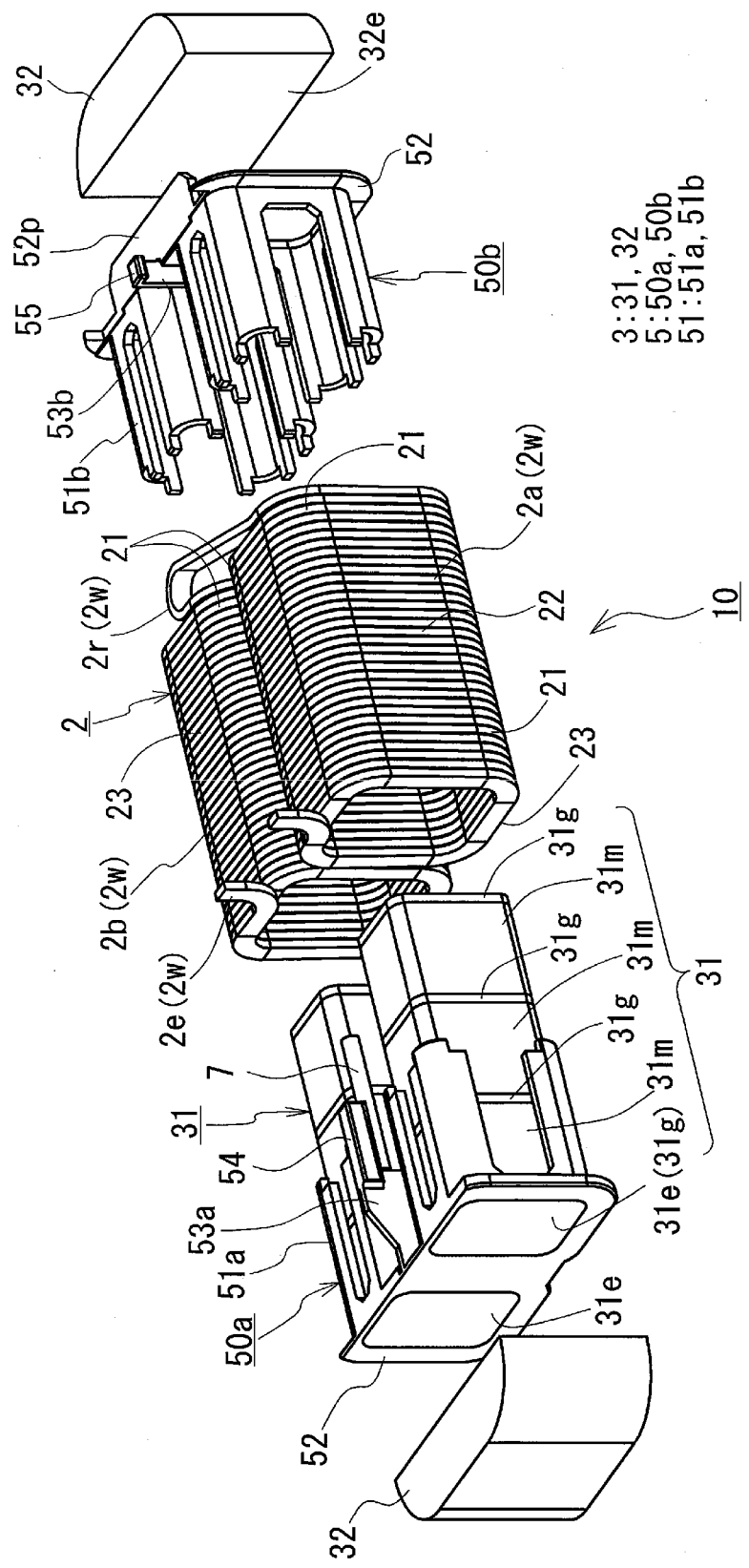
FIG. 3 is a schematic exploded perspective view of an assembly of a coil and a magnetic core included in the reactor according to the first embodiment.

The coil 2 will be described mainly with reference to FIGS. 3 and 5. To facilitate understanding, FIG. 5 mainly illustrates the coil 2 and the temperature sensor 7, and support portions, partitioning portions, etc., of the insulator 5 are omitted.

The coil 2 includes the pair of coil elements 2a and 2b, which are formed by helically winding a single continuous wire 2w that does not have a joint, and a coil connecting portion 2r that connects the coil elements 2a and 2b to each other. The coil elements 2a and 2b are hollow cylindrical bodies having the same winding number, and are arranged parallel (next) to each other so that axial directions thereof are parallel to each other. The coil connecting portion 2r is formed by bending a part of the wire 2w in U-shape at the other end (right end in FIG. 3) of the coil 2. With this structure, the coil elements 2a and 2b are wound in the same direction.

The coil elements may instead be made of separate wires, and the wires of the respective coil elements may be bonded together at one end thereof by welding, soldering, pressure bonding, etc., to form a coil.

A coated wire may be appropriately used as the wire 2w, the coated wire including a conductor made of a conductive material, such as copper, aluminum, or an alloy thereof, and an insulating coating made of an insulating material that covers the outer periphery of the conductor. The thickness of the insulating coating is preferably 20 μm or more and 100 μm or less. As the thickness is increased, the occurrence of pin holes can be reduced and the electrical insulation performance can be increased. The conductor is typically a rectangular wire. Other types of wires having various cross-sectional shapes, such as a circular shape, an elliptical shape, and a polygonal shape, may also be used as the conductor. A rectangular wire is advantageous in that (1) a coil having a high space factor can be more easily formed compared to the case in which a circular wire having a circular cross section is used; (2) a contact area between the wire and a bonding layer 42 (FIG. 2) of the case 4, which will be described below, can be easily increased; and (3) a contact area between the wire and terminal hardware parts 8 (FIG. 2), which will be described below, can be easily increased. In this example, a coated rectangular wire is used in which the conductor is composed of a rectangular wire made of copper and the insulating coating is made of an enamel (typically polyamidoimide). The coil elements 2a and 2b are edgewise coils formed by winding the coated rectangular wire edgewise.

Both end portions 2e of the wire that forms the coil 2 extend away from turn-forming portions at one end (left end in FIG. 3) of the coil 2 as appropriate, and typically extend to the outside of the case 4 (FIG. 1). The end portions 2e of the wire are configured such that the insulating coating is removed to expose conductor portions, and the conductor portions are connected to the terminal hardware parts 8 (see FIG. 1) made of a conductive material. The coil 2 is connected to an external device (not shown), such as a power supply for supplying power, via the terminal hardware parts 8.

The end surface shape of each of the coil elements 2a and 2b as viewed in the axial direction (cross sectional shape along a plane orthogonal to the axial direction) is a rectangular shape with rounded corners including four rounded corner portions 21 and long and short linear portions 22 and 23 that connect the rounded corner portions 21. Therefore, as illustrated in FIG. 5, the contour of each of the coil elements 2a and 2b includes curves that define the rounded corner portions 21 and straight lines that define the linear portions 22 and 23.

The shape of the end face of each of the coil elements 2a and 2b may instead be a shape obtained by rounding the corners a polygon other than a rectangle. However, the shape obtained by rounding the corners of a rectangle is advantageous in that (1) the wire 2w can be easily wound so that the coil can be easily manufactured; (2) the inner peripheral shape of the coil elements is simple so that inner core portions having an outer peripheral shape similar to the inner peripheral shape of the coil elements can be easily formed; and (3) the dead space and size are small.

The rounding radius of each rounded corner portion 21 may be selected as appropriate. The rounding radius may be selected in consideration of, for example, the size of the coil 2 and the size of the wire 2w that is used (width and thickness of the wire in the case where a rectangular wire is used). In particular, in the case where the coil 2 is an edgewise coil, the rounding radius of parts of the wire 2w that form the rounded corner portions 21 at the outer periphery of the wire 2w can be easily increased, so that a large trapezoidal space for receiving the temperature sensor 7 can be easily provided between the coil elements 2a and 2b.

Figure 4:
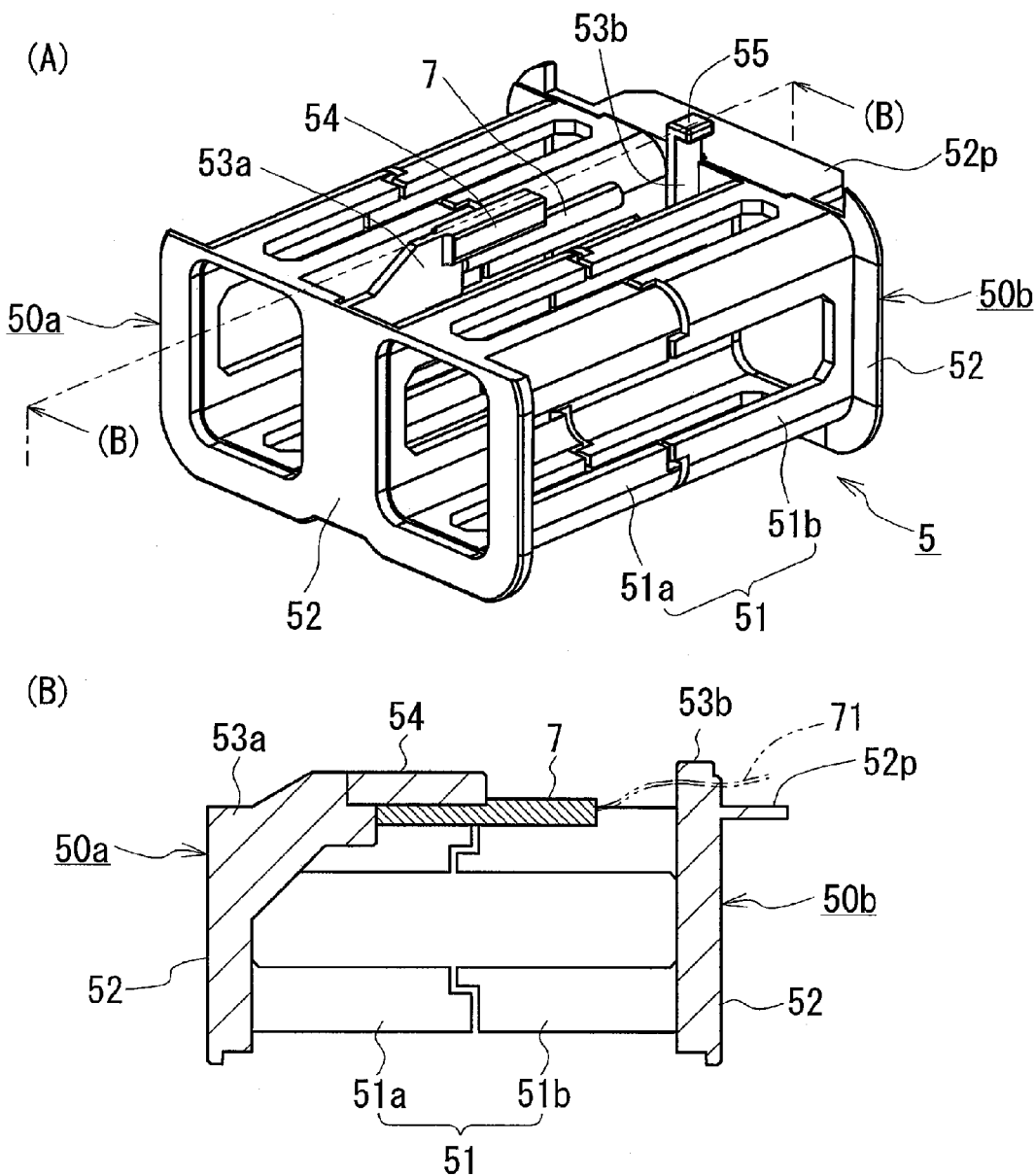
FIG. 4 illustrates an insulator included in the reactor according to the first embodiment, wherein part (A) is a perspective view and part (B) is a sectional view of part (A) taken along line B-B.
Figure 5:
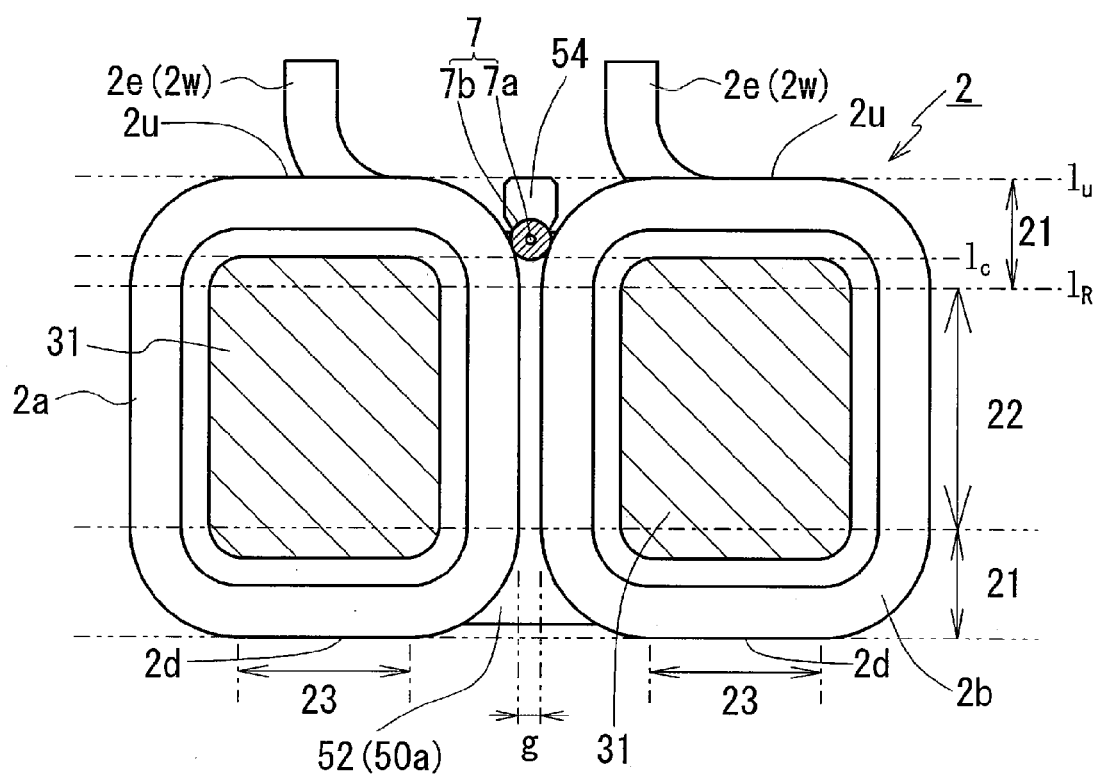
FIG. 5 is a sectional view of FIG. 1 taken along line V-V.

As illustrated in FIG. 5, a small gap g is provided between the linear portions 22 of the coil elements 2a and 2b to increase the insulation between the elements 2a and 2b. The gap g (for example, about 2 mm) is smaller than the thickness (for example, about 3 mm) of the temperature sensor 7, which will be described below. In this example, the gap g is provided by partitioning portions 53a and 53b (FIGS. 3 and 4) of the insulator 5, which will be described below.

As illustrated in FIG. 5, the coil 2 including the rounded corner portions 21 has a trapezoidal space between the rounded corner portions 21 of the coil elements 2a and 2b that oppose each other. More specifically, the trapezoidal space is a space surrounded by a straight line $l_R$, curves, and a straight line (tangent line) $l_u$. The straight line $l_R$ connects intersection points between the rounded corner portions 21 of one coil element 2a at the top side and the long linear portions 22 connected to the rounded corner portions 21 and intersection points between the rounded corner portions 21 of the other coil element 2b at the top side and the long linear portions 22 connected to the rounded corner portions 21. The curves define the adjacent rounded corner portions 21 of the coil elements 2a and 2b. The straight line (tangent line) $l_u$ connects surfaces (top surfaces 2u) of the short linear portions 23 of the coil elements 2a and 2b at the top side. One of the characteristics of the present invention is that the temperature sensor 7 is disposed in this trapezoidal space.

The size of the trapezoidal space can be adjusted by adjusting the rounding radius of the rounded corner portions 21. When the rounding radius is large, the size of the space in which the temperature sensor 7 is disposed can be easily increased. When the rounding radius is small, the size of the coil can be easily reduced. For example, the rounding radius may be selected so that the trapezoidal space is a region that extends downward in FIG. 5 from the straight line $l_u$ (that is, from the top surfaces 2u of the coil 2) within 50% of the height (size in the vertical direction in FIG. 5) of the coil 2 (for example, a region within 20 mm from the straight line $l_u$, although this depends on the size of the reactor). This region includes a maximum temperature point of the reactor 1 (coil 2), and the temperature difference can be set to 2° C. or less.

The temperature sensor 7 is preferably disposed in a region in which the inner core portions 31 are not disposed in the above-described trapezoidal space. In this example, the inner core portions 31 having an outer peripheral shape that is similar to the inner peripheral shape of the coil elements 2a and 2b are coaxially disposed in the respective coil elements 2a and 2b. When the top surfaces of the inner core portions 31 are connected by a straight line (tangent line) $l_u$, a region above the tangent line $l_c$ serves as the region in which the inner core portions 31 are not disposed.

In this example, as illustrated in FIG. 5, the temperature sensor 7 is disposed in a region in which the inner core portions 31 are not disposed in the trapezoidal space (region surrounded by the straight line $l_u$, the tangent line $l_c$, and curves that define the adjacent rounded corner portions 21 at the top side of the coil elements 2a and 2b). In addition, in this example, the thickness of the temperature sensor 7 is sufficiently larger than the gap g between the linear portions 22 of the coil 2. Therefore, the temperature sensor 7 is supported by the rounded corner portions 21 at the top side of the coil elements 2a and 2b and does not fall to a region in which the inner core portions 31 are disposed, that is, to a region below the tangent line $l_c$. Namely, in this example, the temperature sensor 7 is automatically disposed in the region surrounded by the straight line $l_u$, the tangent line $l_c$, and the rounded corner portions 21 in the trapezoidal space, and is supported by the rounded corner portions 21.

The trapezoidal space extends from one end face to the other end face of the coil 2, and the temperature sensor 7 may be disposed at any location in this space. However, the temperature sensor 7 is preferably disposed in a central region of the trapezoidal space that includes the center of the coil 2 in the axial direction. The central region may be, for example, a region within 30% of the length of the coil 2 in the axial direction from the center, that is, a region including the center and extending for 60% of the length of the coil 2 in the axial direction. For example, the central region may be a region within 15 mm from the center, that is, a region including the center and extending 30 mm or less, although this depends on the size of the reactor. In the case where the central region is set within this range, the central region includes the maximum temperature point of the reactor 1 (coil 2) and the temperature difference therein can be set to 2° C. or less. In this example, the temperature sensor 7 is disposed in this central region.

[Temperature Sensor]

The temperature sensor 7 may be a rod-shaped member (see FIG. 4) including a thermosensitive element 7a, such as a thermister, and a protective portion 7b that protects the thermosensitive element 7a. The protective portion 7b may be, for example, a tube made of a resin. The temperature sensor 7 is connected to a wire 71 (FIGS. 1 and 4(B)) for transmitting the acquired information to an external device, such as a control device.

[Magnetic Core]

The magnetic core 3 will be described with reference to FIG. 3. The magnetic core 3 includes the pair of inner core portions 31 that are covered by the respective coil elements 2a and 2b and the pair of outer core portions 32 on which the coil 2 is not provided and which are not covered by the coil 2. In this example, each inner core portion 31 is a pillar-shaped member having the shape of a rectangular parallelepiped with corners rounded along the inner peripheral shape of each of the coil elements 2a and 2b as described above. Each outer core portion 32 is a pillar-shaped member having a pair of trapezoidal surfaces. The magnetic core 3 is formed in a ring shape such that the outer core portions 32 are arranged so as to sandwich the inner core portions 31 that are separated from each other and such that end faces 31e of the inner core portions 31 are in contact with inner end faces 32e of the outer core portions 32. When the coil 2 is excited, the inner core portions 31 and the outer core portions 32 form a closed magnetic circuit.

Each inner core portion 31 is a stack formed by alternately stacking core pieces 31m made of a magnetic material and gap members 31g typically made of a non-magnetic material. Each outer core portion 32 is a core piece made of a magnetic material.

Each core piece may be a compact made of magnetic powder, or a stack formed by stacking a plurality of magnetic sheets (for example, electromagnetic steel sheets) having insulating coatings. The compact may be a powder compact made of powder of a soft magnetic material, for example, an iron-group metal such as Fe, Co, or Ni, a Fe-base alloy such as Fe—Si, Fe—Ni, Fe—Al, Fe—Co, Fe—Cr, or Fe—Si—Al, a rare-earth metal, or an amorphous magnetic material. The compact may instead be a sintered compact formed by performing sintering after press forming of the powder, or a molded hardened body formed by performing injection molding or cast molding of a mixture of the powder and a resin. The core piece may instead be a ferrite core, which is sintered material of a metal oxide. When the core pieces are made of compacts, the core pieces and the magnetic core can be easily formed even when the three-dimensional shapes thereof are complex.

Coated powder containing coated particles in which the surfaces of particles made of the soft magnetic material are coated with insulating coatings may preferably be used as the material of the powder compact. The powder compact is obtained by molding the coated powder and then performing a heat treatment at a temperature lower than or equal to an allowable temperature limit of the insulating coatings. The insulating coatings are typically made of a silicone resin or a phosphate.

The inner core portions 31 and the outer core portions 32 may be made of different materials. For example, each inner core portion 31 may be formed of the above-described powder compact or a stack, and each outer core portion 32 may be formed of the molded hardened body. In such a case, the saturation magnetic flux density of the inner core portions 31 can be easily set so as to be greater than that of the outer core portions 32. In this example, each core piece is formed of a powder compact made of powder of a soft magnetic material containing iron, such as iron or steel.

The gap members 31g are sheet-shaped members arranged in the gaps between the core pieces for the purpose of adjustment of the inductance. The gap members 31g are made of a material having a magnetic permeability lower than that of the core pieces. Typically, a non-magnetic material, such as alumina, glass epoxy resin, or unsaturated polyester, is used. Alternatively, the gap members 31g may be made of a mixture in which magnetic powder (for example, ferrite, Fe, Fe—Si, or sendust) is dispersed in a non-magnetic material, such as a ceramic or a phenol resin. In such a case, flux leakage at the gaps can be reduced. Further alternatively, air gaps may instead be provided.

The numbers of core pieces and gap members may be selected as appropriate so that the reactor 1 has a desired inductance. The shapes of the core pieces and the gap members may be selected as appropriate. In this example, each inner core portion 31 includes a plurality of core pieces 31m and a plurality of gap members 31g. However, the number of gap members may instead be one. Alternatively, the gap members may be omitted depending on the material of the core pieces. Each outer core portion 32 may either be configured to include only one core piece or a plurality of core pieces. In the case where the core pieces are formed of powder compacts and each of the inner and outer core portions is formed of a plurality of core pieces, the size of each core piece can be reduced. Accordingly, formability of the core pieces can be increased.

The core pieces, or the core pieces 31m and the gap members 31g, may be integrated together by, for example, applying an adhesive thereto or winding a piece of adhesive tape therearound. The inner core portions 31 may be formed by using an adhesive, and be bonded to the outer core portions 32 without using an adhesive.

Alternatively, the inner core portions 31 may be integrated by using heat-shrinkable tubes or cold shrinkable tubes made of an insulating material. In this case, the tubes also serve as insulating members between the coil elements 2a and 2b and the inner core portions 31.

Alternatively, the magnetic core 3 may instead be integrated by using a band-shaped fastening member capable of holding the magnetic core 3 in a ring shape. More specifically, the band-shaped fastening member may be provided around the outer periphery of the magnetic core 3 assembled in a ring shape and the outer periphery of the assembly 10 to hold the magnetic core 3 in a ring shape. The band-shaped fastening member may be made of a non-magnetic material having a high heat resistance. For example, a commercially available tie member (a Ty-Rap (registered trademark of Thomas & Betts International, Inc.), a PEEK tie (tie band manufactured by Hellermann Tyton Co., Ltd.), a stainless steel band (manufactured by Panduit Corporation), etc.) may be used. A cushioning member (made of, for example, a resin, such as ABS resin, PPS resin, PBT resin, or epoxy resin, or a rubber, such as silicone rubber) may be interposed between the magnetic core and the band-shaped fastening member and between the coil and the band-shaped fastening member. In such a case, the coil 2 and the magnetic core 3 can be prevented from being damaged by the fastening force applied by the band-shaped fastening member.

The magnetic core 3 of this example is formed such that installation-side surfaces of the inner core portions 31 are not flush with installation-side surfaces of the outer core portions 32. The installation-side surfaces of the outer core portions 32 project from the inner core portions 31, and are flush with installation-side surfaces (bottom surfaces 2d in FIG. 5) of the coil 2. Accordingly, an installation-side surface of the assembly 10 of the coil 2 and the magnetic core 3 include the bottom surfaces 2d of the coil elements 2a and 2b and the installation-side surfaces of the outer core portions 32, and both the coil 2 and the magnetic core 3 can be in contact with the bonding layer 42 (FIG. 2), which will be described below. Therefore, the reactor 1 has a high heat dissipation performance. In addition, since the installation-side surface of the assembly 10 includes the surfaces of both the coil 2 and the magnetic core 3, the contact area between the assembly 10 and a fixation object is sufficiently large. Therefore, the reactor 1 can be stably installed. Furthermore, when the core pieces are formed of powder compacts, parts of the outer core portions 32 that project from the inner core portions 31 may be used magnetic flux paths.

[Insulator]

The insulator 5 will be described with reference to FIGS. 3 and 4. The insulator 5 is dividable into a pair of segmented pieces 50a and 50b in the axial direction of the coil 2, and is formed by assembling the segmented pieces 50a and 50b together. The insulator 5 includes the tubular portions 51 that house the respective inner core portions 31 and the frame plate portions 52 that are interposed between the end faces of the coil elements 2a and 2b and the inner end faces 32e of the outer core portions 32. The tubular portions 51 insulate the coil elements 2a and 2b from the inner core portions 31, and the frame plate portions 52 insulate the coil elements 2a and 2b from the outer core portions 32. One of the characteristics of the insulator 5 is that it includes a sensor holder portion 54 that presses the temperature sensor 7 disposed in the above-described trapezoidal space against the coil 2.

The segmented pieces 50a and 50b include a plurality of rod-shaped support portions 51a and 51b that are arranged at the corners of the inner core portions 31. The support portions 51a and 51b are arranged so as to extend from the respective frame plate portions 52, and have irregular shapes at the ends thereof. The end portions having the irregular shapes engage with each other and serve as positioning portions when the segmented pieces 50a and 50b are assembled together, as illustrated in FIG. 4(A). The support portions 51a and 51b form the tubular portions 51 when the segmented pieces 50a and 50b are assembled together. In this example, when the segmented pieces 50a and 50b are arranged on the outer peripheral surfaces of the inner core portions 31, only parts (mainly corners) of the inner core portions 31 are covered by the support portions 51a and 51b, and the other parts are exposed. Therefore, in the case where sealing resin is provided, the contact area between the inner core portions 31 and the sealing resin can be increased, and air bubbles can be easily removed when the sealing resin is injected. Thus, the manufacture of the reactor 1 is facilitated.

In this example, the length of the tubular portions 51 is adjusted so that the tubular portions 51 extend over the entire length of the inner core portions 31. However, the length of the support portions 51a and 51b may be reduced (the above-described length is defined as the dimension along the axial direction of the coil). In this case, the insulation between the coil elements 2a and 2b and the inner core portions 31 can be increased by forming insulating coating layers made of an insulating material on the outer peripheries of the inner core portions 31. The insulating coating layers may be made of, for example, an insulating tube such as the above-described heat-shrinkable tube, a piece of insulating tape, or a piece of insulating paper.

Each frame plate portion 52 is a B-shaped flat plate portion having a pair of openings (through holes) through which the inner core portions 31 can be inserted.

One segmented piece 50a (left piece in FIG. 4) has a sensor holder portion 54 at the top side of the frame plate portion 52. More specifically, the sensor holder portion 54 is provided so as to project toward the trapezoidal space on the coil 2 when the segmented piece 50a is assembled to the coil 2 (FIG. 5).

The sensor holder portion 54 is rod-shaped. In this example, as illustrated in FIG. 5, an inner surface of the sensor holder portion 54 that contacts the temperature sensor 7 is formed as an arc-shaped curved surface so that the temperature sensor 7 can be prevented from being excessively pressed and can be easily retained. The length by which the sensor holder portion 54 projects can be selected as appropriate as long as the temperature sensor 7 can be prevented from being separated from the coil 2. In this example, the length by which the sensor holder portion 54 projects is adjusted so that a portion of the temperature sensor 7 having a length (dimension in the left-right direction in FIG. 4(B)) of about ½ the overall length contacts the sensor holder portion 54.

The frame plate portion 52 of the segmented piece 50a also has a partitioning portion 53a. More specifically, the partitioning portion 53a projects toward the coil from the frame plate portion 52 so as to be interposed between the coil elements 2a and 2b when the segmented piece 50a is assembled to the coil 2 (FIG. 5). Owing to the partitioning portion 53a, the linear portions 22 of the coil elements 2a and 2b do not come into contact with each other and the predetermined gap g (FIG. 5) is provided as described above. In this example, the partitioning portion 53a is L-shaped. A portion of the partitioning portion 53a corresponding to the short leg of the letter "L" is provided at the top side of the frame plate portion 52, and serves as a connecting portion between the sensor holder portion 54 and the frame plate portion 52. An end face of the portion of the partitioning portion 53a corresponding to the short leg of the letter "L" serves also as a stopper for the temperature sensor 7, as illustrated in FIG. 4(B). Accordingly, the temperature sensor 7 is prevented from being separated from the coil 2 by the sensor holder portion 54, and is positioned relative to the coil 2 in the axial direction of the coil 2 in accordance with the position of the end face of the partitioning portion 53a. In this example, the length by which the partitioning portion 53a projects is adjusted so that the temperature sensor 7 is disposed in the central region of the trapezoidal space as described above. The length by which the partitioning portion 53a projects can be changed as appropriate.

Another one of the characteristics of the insulator 5 is that it includes a hook portion 55 (FIG. 4(A)) on the frame plate portion 52 of the other segmented piece 50b (right piece in FIG. 4(A)). The wire 71 connected to the temperature sensor 7 is hooked on the hook portion 55.

The shape of the hook portion 55 is not particularly limited. In this example, the segmented piece 50b also has a partitioning portion 53b, which is band-shaped, and a part of the partitioning portion 53b serves as the hook portion 55. Similar to the above-described segmented piece 50a, the partitioning portion 53b is a band-shaped plate that projects toward the coil from the frame plate portion 52. An end portion of the partitioning portion 53b extends upward in a direction orthogonal to both the arrangement direction and axial direction of the coil elements (in the vertical direction in FIG. 4). When the segmented piece 50b is assembled to the coil 2 (FIG. 5), the partitioning portion 53b is formed in an L-shape by being bent in the arrangement direction at a position sufficiently separated from a turn-forming surface of the coil 2. A portion corresponding to the short leg of the letter "L" serves as the hook portion 55.

A plain band-shaped member that is not bent in an L-shape as described above may instead be used, and the wire 71 may be wound around an end portion of the band-shaped member that projects from the turn-forming surface of the coil 2. Thus, this end portion may be used as the hook portion 55. Alternatively, a through hole may be formed in the above-described band-shaped member, and movement of the wire 71 may be regulated by inserting the wire 71 through the through hole. Thus, this through hole may be used as the hook portion 55. Alternatively, a plurality of projections or cuts with which the wire 71 can be clamped may be provided on the above-described band-shaped member, and the wire 71 may be secured by clamping the wire 71 with the projections or cuts. Thus, these projections or cuts may be used as the hook portion 55. A rod-shaped member may be used instead of the band-shaped member. The above-described L-shaped portion, the through hole, the projections, the cuts, etc., may be provided on a part of the frame plate portions 52 and used as the hook portion 55. The position of the hook portion 55 may be selected as appropriate. The insulator may include a plurality of hook portions.

The other segmented piece 50b also includes a base 52p on which the coil connecting portion 2r is placed and which insulates the coil connecting portion 2r from the corresponding outer core portion 32. The base 52p projects from the frame plate portion 52 of the segmented piece 50b in a direction opposite to the direction in which the partitioning portion 53b projects (rightward in FIG. 4(B)). In other words, the partitioning portion 53b projects from one side of the frame plate portion 52 of the segmented piece 50b (left side in FIG. 4(B)), and the base 52p projects from the other side.

In this example, in the state in which the segmented pieces 50a and 50b are assembled together, the partitioning portions 53a and 53b exist only in regions corresponding to parts of the coil elements in the axial direction (in particular, in regions near the end faces of the coil elements). With this structure, the space between the coil elements 2a and 2b is filled with sealing resin, or serves an air space in the case where the sealing resin is not provided. Therefore, heat dissipation is not easily impeded by the insulator 5, and a high heat dissipation performance is ensured in this case. The partitioning portions 53a and 53b may be omitted. In such a case, the sensor holder portion 54 may be extended so as to be connected to the frame plate portion 52, and the stopper may be provided on the sensor holder portion 54 itself. Alternatively, a partitioning portion may be provided so as to extend over substantially the entire length of the coil elements 2a and 2b in the axial direction. With this configuration, the coil elements 2a and 2b can be sufficiently insulated from each other by the partitioning portion, and a high insulation performance is ensured.

In addition, in this example, positioning projections (not shown) for positioning the outer core portions 32 are provided on surfaces of the frame plate portions 52 of the segmented pieces 50a and 50b that come into contact with the outer core portions 32. Thus, the assembly is facilitated. The positioning projections may be omitted.

The insulator 5 may be formed of an insulating material, such as polyphenylene sulfide (PPS) resin, polytetrafluoroethylene (PTFE) resin, polybutylene terephthalate (PBT) resin, or a liquid crystal polymer (LCP). The insulator 5 may be easily formed by, for example, injection molding even when the shape thereof is complex.

[Case]

The case 4 will be described with reference to FIG. 2. The case 4, which houses the assembly 10 of the coil 2 and the magnetic core 3, includes a plate-shaped bottom plate portion 40 and a frame-shaped side wall portion 41 that stands on the bottom plate portion 40. The bottom plate portion 40 and the side wall portion 41 of the case 4 of the reactor 1 are not formed integrally with each other, but are formed as separate components and integrated together with a fixing member. The bottom plate portion 40 has a bonding layer 42.

(Bottom Plate Portion)

The bottom plate portion 40 is a rectangular plate on which the assembly 10 is placed, and is typically fixed to a fixation object when the reactor 1 is installed on the fixation object. Although the bottom plate portion 40 is at the bottom in the installation state of this example, the bottom plate portion 40 may instead be at the top or a side. The bottom plate portion 40 has the bonding layer 42 on a surface thereof that faces inward when the case 4 is assembled. The external shape of the bottom plate portion 40 may be selected as appropriate. In this example, the bottom plate portion 40 includes attachment portions 400 that project from the four corners of the bottom plate portion 40. The side wall portion 41, which will be described below, also includes attachment portions 411. When the case 4 is formed by assembling the bottom plate portion 40 and the side wall portion 41 together, the attachment portions 400 are stacked on the respective attachment portions 411. The attachment portions 400 and 411 have bolt holes 400h and 411h, respectively, which receive bolts (not shown) for fixing the case 4 to the fixation object. The bolt holes 400h are formed so as to continue to the respective bolt holes 411h in the side wall portion 41. The bolt holes 400h and 411h may either be through holes that are not threaded or screw holes that are threaded, and the number thereof may be selected as appropriate.

Alternatively, the configuration may be such that the side wall portion 41 has no attachment portion and only the bottom plate portion 40 has the attachment portions 400. In this case, the external shape of the bottom plate portion 40 is set so that the attachment portions 400 of the bottom plate portion 40 project from the outer periphery of the side wall portion 41. Alternatively, the configuration may be such that only the side wall portion 41 has the attachment portions 411 and the bottom plate portion 40 has no attachment portion. In this case, the external shape of the side wall portion 41 is set so that the attachment portions 411 of the side wall portion 41 project from the outer periphery of the bottom plate portion 40.

(Side Wall Portion)

The side wall portion 41 is a rectangular frame-shaped member. When the case 4 is assembled by covering an opening at one side of the side wall portion 41 with the bottom plate portion 40, the side wall portion 41 is arranged so as to surround the assembly 10, and an opening at the other side is left uncovered. In this example, the side wall portion 41 has a rectangular shape that follows the external shape of the bottom plate portion 40 in a region at an installation side at which the reactor 1 is installed on the fixation object, and has a curved shape that follows the outer peripheral surface of the assembly 10 of the coil 2 and the magnetic core 3 in a region at a side at which the opening is not covered. In the state in which the case 4 is assembled, the outer peripheral surface of the coil 2 is in the vicinity of the inner peripheral surface of the side wall portion 41. The gap between the outer peripheral surface of the coil 2 and the inner peripheral surface of the side wall portion 41 is very small, and is about 0 mm to 1.0 mm. In addition, in this example, overhanging portions are provided in the region at the open side of the side wall portion 41, and are arranged so as to cover the trapezoidal surfaces of the outer core portions 32 of the assembly 10. As illustrated in FIG. 1, in the state in which the assembly 10 is housed in the case 4, the coil 2 is exposed and the outer core portions 32 of the magnetic core 3 are substantially covered by components of the case 4. The overhanging portions provide various advantages. For example, (1) resistance to vibration can be increased; (2) the rigidity of the case 4 (side wall portion 41) can be increased; and (3) the assembly 10 can be provided with protection from the external environment and mechanical protection. The above-described overhanging portions may be omitted so that the coil 2 and one or both of the trapezoidal surfaces of the outer core portions 32 are exposed.

In the case where the reactor 1 is installed such that the bottom plate portion 40 is at the top or a side, the overhanging portions prevent the assembly 10 from falling from the side wall portion 41. Position fixing portions for preventing the outer core portions 32 from falling may be additionally provided on the inner surfaces of the overhanging portions. In this example, one of the overhanging portions is used as a terminal base 410 (described below).

[Hook Portion]

Figure 2:
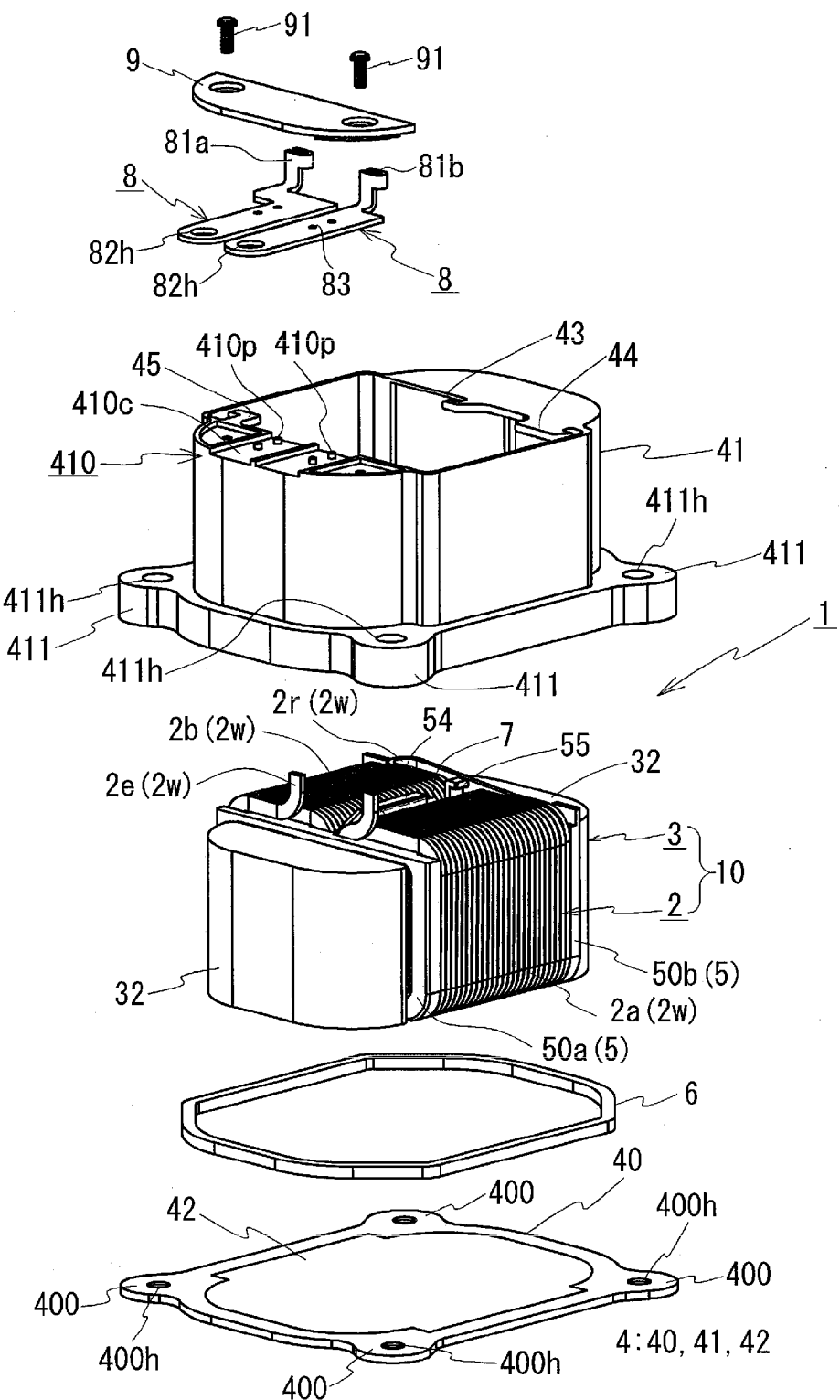
FIG. 2 is a schematic exploded perspective view of the reactor according to the first embodiment.

One of the characteristics of the side wall portion 41 is that it includes hook portions 43 and 44 on an edge of the overhanging portion that covers one outer core portion 32 (right outer core portion 32 in FIG. 2). The wire 71 (FIG. 1) that is connected to the temperature sensor 7 is hooked on the hook portions 43 and 44.

In this example, the hook portions 43 and 44 are both L-shaped pieces, and are provided on the side wall portion 41 such that portions of the hook portions 43 and 44 corresponding to the short leg of the letter "L" face away from each other, that is, such that portions corresponding to the opening of the letter "L" face away from each other. In this example, as illustrated in FIG. 1, one hook portion 43 is located above the position between the coil elements 2a and 2b, and the other hook portion 44 is located above one coil element 2a. The hook portion 55 of the insulator 5 is located between the one hook portion 43 and the other hook portion 44, so that the wire 71 can be easily routed such that the temperature sensor 7 does not easily fall. The side wall portion 41 further includes a hook portion 45 composed of an L-shaped piece at a position diagonally opposite the hook portion 44 (at an edge of the terminal base 410).

The shapes, number, and arrangement positions of the hook portions provided on the side wall portion 41 are not particularly limited. For example, the configuration may be such that only the hook portion 44 is provided. Alternatively, for example, similar to the above-described hook portion 55 provided on the insulator 5, a through hole, at least one projection, at least one cut, etc., provided at an appropriate position around the opening in the side wall portion 41 may be used as a hook portion. In this example, the hook portions 43, 44, and 45 are provided at the edges of the opening in the side wall portion 41 that extend in the arrangement direction of the coil elements 2a and 2b. However, the hook portions may, of course, instead be provided at the edges that extend in the axial direction of the coil elements 2a and 2b. In the case where the side wall portion 41 is made of a resin as described below, the hook portions 43, 44, and 45 can be easily formed integrally with the side wall portion 41 by, for example, injection molding. The manner in which the wire 71 is hooked will be described below.

[Attachment Positions]

Similar to the bottom plate portion 40, the side wall portion 41 includes the attachment portions 411 that project from the four corners of the side wall portion 41 in a region at the installation side. The attachment portions 411 have the respective bolt holes 411h that define the attachment positions. The bolt holes 411h may be formed directly in the material of the side wall portion 41, or be formed by arranging cylindrical bodies made of another material. For example, in the case where the side wall portion 41 is made of a resin as described below, metal tubes made of a metal, such as brass, steel, or stainless steel, may be used as the cylindrical bodies. In such a case, the strength can be increased and creep deformation of the resin can be suppressed. In this example, the bolt holes 411h are formed by arranging metal tubes.

[Terminal Base]

The overhanging portion that covers the top of the other outer core portion 32 (left outer core portion 32 in FIG. 2) in the region at the open side of the side wall portion 41 functions as the terminal base 410. The pair of terminal hardware parts 8 to which the respective end portions 2e of the wire 2w are connected are fixed to the terminal base 410.

[Terminal Hardware Part]

The terminal hardware parts 8 are conductive members formed by appropriately bending plates made of a conductive material, such as copper, a copper alloy, aluminum, or an aluminum alloy. The terminal hardware parts 8 include bonding portions 81a and 81b at one end thereof and through holes 82h at the other end thereof. The end portions 2e of the wire are bonded to the bonding portions 81a and 81b by soldering or welding. Connecting members, such as bolts, for connecting the terminal hardware parts 8 to an external device, such as a power supply, are fitted to the through holes 82h. The terminal hardware parts 8 are fixed to the side wall portion 41 at intermediate portions thereof.

In this example, the bonding portions 81a and 81b are U-shaped. The coil 2 can be electrically connected to the terminal hardware parts 8 by placing the end portions 2e of the wire in the U-shaped spaces defined by the bonding portions 81a and 81b and, for example, filling the spaces between the end portions 2e of the wire and the bonding portions 81a and 81b with solder. Alternatively, the above-described electrical connection may instead be provided by crimping the bonding portions 81a and 81b while the end portions 2e of the wire are placed in the U-shaped spaces, so that the bonding portions 81a and 81b reliably contact the end portions 2e of the wire, and then performing welding, such as TIG welding, pressure bonding, or soldering.

The shape of the terminal hardware parts 8 illustrated in FIG. 2 is an example, and may be changed as appropriate as long as the bonding portions, connecting portions that provide connection to an external device, and fixing portions to be fixed to the side wall portion 41 are provided. For example, the bonding portions may be flat plate-shaped.

As illustrated in FIG. 2, the terminal base 410 has recessed grooves 410c for receiving the intermediate portions of the terminal hardware parts 8. Positioning projections 410p for positioning the terminal hardware parts 8 are provided in the recessed grooves 410c. The terminal hardware parts 8 have positioning holes 83 for receiving the projections 410p. The shapes, numbers, and arrangement positions of the positioning projections 410p and the positioning holes 83 are not particularly limited as long as the terminal hardware parts 8 can be positioned. The positioning projections 410p and the positioning holes 83 may be omitted. Alternatively, the projections may be provided on the terminal hardware parts while the holes are formed in the terminal base.

The terminal hardware parts 8 fitted in the recessed grooves 410c are covered with a terminal fixing member 9 from above, and is fixed to the terminal base 410 by fastening the terminal fixing member 9 with bolts 91. The terminal fixing member 9 may preferably be formed of an insulating material, such as an insulating resin, used as a material of the case, which will be described below.

In the case where the side wall portion 41 is made of an insulating resin described below, the terminal fixing member 9 and the bolts 91 may be omitted, and the side wall portion, the terminal hardware parts 8, and the terminal base may be formed integrally with each other by performing insert-molding of the terminal hardware parts 8. In this case, the number of components and the number of assembly steps are reduced, so that the reactor can be easily produced.

Alternatively, molded parts obtained by covering the intermediate portions of the terminal hardware parts 8 with an insulating material may be formed, and these molded parts may be fixed to the side wall portion 41.

The side wall portion 41 may also be provided with a support base (not shown) that supports the other end portions of the terminal hardware parts 8 in which the through holes 82h are formed. For example, in the case where the side wall portion 41 is formed of an insulating resin described below, the support base may be formed integrally with the side wall portion 41 by using the insulating resin. When nuts or the like are appropriately arranged on the support base and the through holes 82h are arranged coaxially with the nut holes, the terminal hardware parts 8 may be connected to the external device by fitting the connecting members, such as bolts, to the nuts or the like.

(Materials)

The case 4 may be made of, for example, a metal material. Since metal materials generally have high thermal conductivities, a case having a high heat dissipation performance can be obtained. In addition, since the case is conductive, the case functions as a magnetic shield and magnetic flux leakage can be suppressed. The metal material is preferably a non-magnetic metal since the case is arranged near the coil 2.

Specifically, the metal may be, for example, aluminum (thermal conductivity: 237 W/m·K) or an alloy thereof, magnesium (156 W/m·K) or an alloy thereof, copper (398 W/m·K) or an alloy thereof, silver (427 W/m·K) or an allow thereof, iron (80 W/m·K), or an austenitic stainless steel (for example, SUS304: 16.7 W/m·K). When aluminum, magnesium, or an alloy thereof is used, the weight of the case can be reduced, so that the weight of the reactor can be reduced. In particular, aluminum and aluminum alloys have a high corrosion resistance, and magnesium and magnesium alloys have a high damping performance. Therefore, these materials are suitable for use as a material of an on-vehicle component. In the case where, for example, a case having the shape of a bottomed tube or the frame-shaped side wall portion 41 is formed by using a metal material, casting, such as die casting, or plastic working, such as press working, may be performed. In the case where the plate-shaped bottom plate portion 40 is formed by using a metal material, punching, for example, may be performed.

Alternatively, the case 4 may be made of a non-metal material, such as polybutylene terephthalate (PBT) resin, urethane resin, polyphenylene sulfide (PPS) resin, or acrylonitrile butadiene styrene (ABS) resin. These non-metal materials generally have an excellent electrical isolation performance. Therefore, insulation between the coil 2 and the case 4 can be increased. In addition, these non-metal materials are lighter than the above-described metal materials, and therefore the weight of the reactor 1 can be reduced. The heat dissipation performance can be increased when filler made of a ceramic described below is mixed into the above-mentioned resins. In the case where, for example, a case having the shape of a bottomed tube, the plate-shaped bottom plate portion 40, or the frame-shaped side wall portion 41 is formed by using a resin, injection molding may be appropriately performed.

The bottom plate portion 40 and the side wall portion 41 may be made of the same type of material. In this case, both portions have the same thermal conductivity. Alternatively, since the bottom plate portion 40 and the side wall portion 41 are formed as separate components, they may be made of different materials. In this case, the materials may be selected so that the thermal conductivity of the bottom plate portion 40 is higher than the thermal conductivity of the side wall portion 41. In such a case, the heat of the coil 2 and the magnetic core 3 arranged on the bottom plate portion 40 can be efficiently transmitted to the fixation object, such as a cooling base. In this example, the bottom plate portion 40 is made of aluminum or an aluminum alloy, and the side wall portion 41 is made of PBT resin. In the case where the bottom plate portion 40 is formed of a conductive material, an alumite treatment may be performed to form an extremely thin insulating coating (with a thickness of about 1 μm to 10 μm) on the surface of the bottom plate portion 40. Thus, the insulation performance can be increased.

(Connecting Method)

Various types of fixing members may be used to join the bottom plate portion 40 and the side wall portion 41 together. For example, a fastening member, such as an adhesive or a bolt, may be used as a fixing member. In this example, bolt holes (not shown) are formed in the bottom plate portion 40 and the side wall portion 41, and bolts (not shown) are used as the fixing members. The bolts are screwed into the bolt holes to join the bottom plate portion 40 and the side wall portion 41 together.

(Bonding Layer)

The bottom plate portion 40 includes the bonding layer 42 at least in regions where the installation-side surfaces (bottom surfaces $2d$ (FIG. 5)) of the coil 2 are in contact therewith.

When the bonding layer 42 has a single-layer structure made of an insulating material, the bonding layer 42 can be easily formed and the coil 2 can be insulated from the bottom plate portion 40 even when the bottom plate portion 40 is made of a metal. When the bonding layer 42 has a multilayer structure made of an insulating material, the insulation performance can be increased. When the layers of the multilayer structure are made of the same material, the thickness of each layer can be reduced. Even when pin holes are formed as a result of the reduction in the thickness of each layer, an insulation can be provided since the pin holes can be covered by the adjacent layers. When the layers of the multilayer structure are made of different types of materials, multiple functions, such as insulation between the coil 2 and the bottom plate portion 40, adhesion between the coil 2 and the bottom plate portion 40, and heat dissipation from the coil 2 to the bottom plate portion 40, can be provided. In this case, at least one of the layers is made of an insulating material.

The insulation performance of the bonding layer 42 can be increased as the thickness of the bonding layer 42 (total thickness in the case where the bonding layer 42 has a multilayer structure) is increased. The heat dissipation performance of the bonding layer 42 can be increased and the size can be reduced as the thickness of the bonding layer 42 (total thickness in the case where the bonding layer 42 has a multilayer structure) is reduced. The (total) thickness of the bonding layer 42 may be set so as to be less than 2 mm, 1 mm or less, 0.5 mm or less, although this depends on the material of the bonding layer 42. In the case where the bonding layer 42 is made of a material having a high thermal conductivity, which will be described below, a high heat dissipation performance can be achieved even when, for example, the (total) thickness is 1 mm or more. Even when the bonding layer 42 is made of a material having a low thermal conductivity (for example, 1 W/m·K or less), a high heat dissipation performance can be achieved when the (total) thickness is small (preferably 0.5 mm or less) as described above. Here, the thickness of the bonding layer 42 is the thickness immediately after the forming process. The thickness of the bonding layer 42 may be reduced (by, for example, about 0.1 mm) after the assembly 10 is placed on the bonding layer 42.

The shape of the bonding layer 42 is not particularly limited as long as the area of the bonding layer 42 is large enough to allow the installation-side surfaces (bottom surfaces $2d$) of the coil 2 to reliably contact the bonding layer 42. In this example, as illustrated in FIG. 2, the shape of the bonding layer 42 follows the shape of the installation-side surface of the assembly 10, that is, the installation-side surfaces of both the coil 2 and the outer core portions 32. Therefore, both the coil 2 and the outer core portions 32 can reliably contact the bonding layer 42.

The bonding layer 42 may have a multilayer structure including an adhesive layer made of an insulating material at the front side at which the installation-side surfaces of the coil 2 contact the bonding layer 42, and a heat dissipation layer made of a material having a high thermal conductivity at the side at which the bottom plate portion 40 contacts the bonding layer 42. In this case, the bonding layer 42 includes an adhesive layer and a heat dissipation layer.

The adhesive layer may preferably be made of a material having a high adhesive strength. For example, the adhesive layer may be made of an insulating adhesive, such as an epoxy-based adhesive or an acrylic adhesive. The adhesive layer may be formed by, for example, applying the material thereof to the heat dissipation layer or performing screen printing. A sheet-shaped adhesive film may instead be used as the adhesive layer. When the sheet-shaped adhesive film is used, the adhesive layer or the bonding layer can be easily formed in a desired shape irrespective of whether the sheet-shaped adhesive film has a single-layer structure or a multilayer structure. In this example, the adhesive layer has a single-layer structure made of an insulating adhesive.

The heat dissipation layer may be made of a material having a high heat dissipation performance, preferably, a material having a thermal conductivity of more than 2 W/m·K. The thermal conductivity of the heat dissipation layer is preferably as high as possible, and may be 3 W/m·K or more, more preferably, 10 W/m·K or more, and still more preferably, 20 W/m·K or more. Most preferably, a material having a thermal conductivity of 30 W/m·K or more is used.

The heat dissipation layer may be made of an insulating resin (for example, epoxy resin or acrylic resin) containing the above-described filler made of a ceramic. When this material is used, a heat dissipation layer having a high heat dissipation performance and a high electrical insulation performance can be obtained. In addition, in this case, both the heat dissipation layer and the adhesive layer are made of an insulating material. In other words, the entire body of the bonding layer is made of an insulating material. Therefore, the insulation performance of the bonding layer can be further increased. In the case where the insulating resin is an adhesive, the adhesiveness between the heat dissipation layer and the adhesive layer can be increased, and the bonding layer including this heat dissipation layer is capable of strongly bonding the coil 2 to the bottom plate portion 40. The adhesive layer and the heat dissipation layer may be made of different types of adhesives. However, when the adhesive layer and the heat dissipation layer are made of the same type of adhesive, the adhesiveness can be increased and the bonding layer can be easily formed. The entire body of the bonding layer may be made of the insulating adhesive containing the filler. In this case, the bonding layer has a multilayer structure made of a single type of material.

The heat dissipation layer made of the resin containing the filler may be easily formed by, for example, applying the material to the bottom plate portion 40 or performing screen printing.

Alternatively, a heat dissipation layer made of a metal material may be provided. Metal materials generally have a high thermal conductivity, but are conductive; therefore, the adhesive layer is required to have a higher insulation performance. In addition, the heat dissipation layer made of a metal material tends to be heavy. A heat dissipation layer may be provided which is made of a non-metallic inorganic material, such as a ceramic, more particularly, a type of material selected from oxides, carbides, and nitrides of metal elements, B, and Si. In such a case, both a high heat dissipation performance and a high electrical insulation performance can be achieved. More specific examples of ceramics include silicon nitride ($Si_3N_4$) of about 20 W/m·K to 150 W/m·K, alumina ($Al_2O_3$) of about 20 W/m·K to 30 W/m·K, aluminum nitride (AlN) of about 200 W/m·K to 250 W/m·K, boron nitride (BN) of about 50 W/m·K to 65 W/m·K, and silicon carbide (SiC) of about 50 W/m·K to 130 W/m·K. The heat dissipation layer made of a ceramic as described above may be formed by, for example, a deposition method, such as a PVD method or a CVD method, or by preparing a sintered plate of the ceramic and bonding the plate to the bottom plate portion 40 with an appropriate adhesive.

Alternatively, a sheet member having a high heat dissipation performance may be bonded to the bottom plate portion 40 with an appropriate adhesive, and this sheet member may be used as the heat dissipation layer.

The heat dissipation layer may either have a single-layer structure or a multilayer structure. In the case where the heat dissipation layer has a multilayer structure, at least one layer may be made of a material different from that of other layers. For example, the heat dissipation layer may have a multilayer structure made of materials having different thermal conductivities.

When the heat dissipation layer is provided, the heat dissipation performance can be increased by the heat dissipation layer. Therefore, in the case where the sealing resin is used, the degree of freedom for selection of usable sealing resin is increased. For example, a resin having a low thermal conductivity, such as a resin that does not contain filler, may be used as the sealing resin.

In this example, the heat dissipation layer is made of an epoxy-based adhesive containing filler made of alumina (thermal conductivity: 3 W/m·K or more). Thus, in this example, the entire body of the bonding layer is made of an insulating adhesive. In addition, in this example, the heat dissipation layer has a two-layer structure made of the adhesive containing the filler. The thickness of one of the layers is 0.2 mm, and the total thickness is 0.4 mm (the total thickness including the thickness of the adhesive layer is 0.5 mm). The heat dissipation layer may instead include three or more layers.

[Other Members Housed in Case]

A back surface of one outer core portion 32 may be brought into contact with the side wall portion 41 of the case 4 while a pressing member (for example, a leaf spring) that presses the other outer core portion 32 toward the one outer core portion 32 is inserted between a back surface of the other outer core portion 32 and the side wall portion 41. In such a case, the gap length can be prevented from being varied due to external factors such as vibration and impact. In the case where the pressing member is used, the gap members 31g may be formed as elastic gap members made of an elastic material, such as silicone rubber or fluororubber. In such a case, the gap members 31g may be deformed so as to adjust the gap length or absorb dimensional errors to some extent.

Various physical quantity sensors, such as a current sensor, other than the temperature sensor may be additionally contained in the case 4. Wires connected to the sensors may be hooked on, for example, the hook portion 45 of the case 4.

[Sealing Resin]

The case 4 may be filled with the sealing resin (not shown) made of an insulating resin. In this case, the end portions 2e of the wire are arranged so as to be exposed from the sealing resin, so that the end portions 2e of the wire can be bonded to the terminal hardware parts 8 by welding, soldering, or the like. The end portions 2e of the wire and the terminal hardware parts 8 may be covered with the sealing resin after they are joined together by welding or the like. The amount of the sealing resin to be used may be selected as appropriate. The top surfaces 2u of the coil 2 may either be entirely covered by the sealing resin, or be exposed from the sealing resin.

The above-described sealing resin may be, for example, epoxy resin, urethane resin, or silicone resin. The sealing resin may contain filler having a high insulation performance and a high thermal conductivity, for example, filler made of at least one type of ceramic selected from silicon nitride, alumina, aluminum nitride, boron nitride, mullite, and silicon carbide. In such a case, the heat dissipation performance can be further increased.

In the case where the case 4 is filled with the sealing resin, a gasket 6 may be provided to prevent the resin in an uncured state from leaking through a gap between the bottom plate portion 40 and the side wall portion 41. In this example, the gasket 6 is a ring-shaped member having a size such that the gasket 6 can be fitted to the outer periphery of the assembly 10 of the coil 2 and the magnetic core 3, and is made of synthetic rubber. The gasket 6 may instead be made of other materials as appropriate. A gasket groove (not shown) for receiving the gasket 6 is formed in the installation-side surface of the side wall portion 41 of the case 4. In the case where the bottom plate portion 40 and the side wall portion 41 are integrated together with an adhesive, the gap therebetween can be sealed with the adhesive, and the leakage of the sealing resin can be prevented. Therefore, the gasket 6 can be omitted.

<<Manufacturing of Reactor>>

The reactor 1 having the above-described structure can typically be manufactured by the steps of preparing the assembly, the side wall portion, and the bottom plate portion ⇒ fixing the coil ⇒ arranging the side wall portion ⇒ assembling the case ⇒ bonding of the terminal hardware parts to the wire ⇒ installing the temperature sensor ⇒ and injecting the sealing resin.

[Preparation of Assembly]

First, a process of manufacturing the assembly 10 of the coil 2 and the magnetic core 3 will be described. Specifically, as illustrated in FIG. 3, the inner core portions 31, in each of which the core pieces 31*m* and the gap members 31*g* are stacked on top of each other, and parts of one segmented piece 50*a* of the insulator 5 are inserted into the coil elements 2*a* and 2*b*. In this example, the inner core portions 31 are formed in a pillar shape by connecting the outer peripheral surfaces of the core pieces 31*m* and the gap members 31*g*, which are stacked on top of each other, with a piece of adhesive tape. Next, parts of the other segmented piece 50*b* of the insulator 5 are inserted into the coil elements 2*a* and 2*b* through the end faces at the other end. At this time, the support portions 51*b* of the segmented piece 50*b* may be used as guides. The core pieces 31*m* and the gap members 31*g* are not necessarily integrated together with a piece of adhesive tape or an adhesive, and may instead be separated from each other. In such a case, some of the core pieces 31*m* and the gap members 31*g* may be inserted into the coil elements 2*a* and 2*b* while being supported by one segmented piece 50*a*, and the remaining core pieces 31*m* and gap members 31*g* may be inserted into the coil elements 2*a* and 2*b* while being supported by the other segmented piece 50*b*. The segmented pieces 50*a* and 50*b* are positioned relative to each other when the irregular portions of the support portions 51*a* and 51*b* of the segmented pieces 50*a* and 50*b* are engaged with each other.

Next, the assembly 10 is formed by arranging the outer core portions 32 so as to sandwich the end faces 31*e* of the inner core portions 31, which are exposed at the openings in the frame plate portions 52, with the inner end faces 32*e* of the outer core portions 32. At this time, the end faces 31*e* of the inner core portions 31 come into contact with the inner end faces 32*e* of the outer core portions 32. The partitioning portions 53*a* and 53*b* of the insulator 5 are interposed between the coil elements 2*a* and 2*b*, and the gap g (FIG. 5) corresponding to the thickness of the partitioning portions 53*a* and 53*b* is formed between the coil elements 2*a* and 2*b*. The sensor holder portion 54 of the insulator 5 is arranged in an upper region of the trapezoidal space formed by the rounded corner portions 21 of the coil elements 2*a* and 2*b* that oppose each other.

[Preparation of Side Wall Portion]

The side wall portion 41 is formed in a predetermined shape by, for example, injection molding. The terminal hardware parts 8 are disposed in the respective recessed grooves 410*c* in the side wall portion 41, and the terminal fixing member 9 is placed on the terminal hardware parts 8. Then, the bolts 91 are fastened, so that the side wall portion 41 to which the terminal hardware parts 8 are fixed is prepared. As described above, a side wall portion that is formed integrally with the terminal hardware parts 8 may instead be prepared.

[Preparation of Bottom Plate Portion and Fixation of Coil]

As illustrated in FIG. 2, the bottom plate portion 40 having a predetermined shape is punched out from a sheet of aluminum or aluminum alloy. The bonding layer 42 having a predetermined shape is formed on a surface of the bottom plate portion 40 by screen printing. Thus, the bottom plate portion 40 having the bonding layer 42 is prepared. The assembly 10 in the assembled state is placed on the bonding layer 42. Subsequently, the bonding layer 42 is cured as appropriate to fix the assembly 10 to the bottom plate portion 40.

Owing to the bonding layer 42, the coil 2 can be tightly bonded to the bottom plate portion 40, and the positions of the coil 2 and the outer core portions 32 can be fixed. Accordingly, the positions of the inner core portions 31 sandwiched by the pair of outer core portions 32 can also be fixed. Therefore, even when the inner core portions 31 and the outer core portions 32 are not bonded to each other with an adhesive, or when the core pieces 31*m* and the gap members 31*g* are not joined together with an adhesive or the like, the inner core portions 31 and the outer core portions 32 can be integrated together to form the magnetic core 3 in a ring shape by the bonding layer 42. When the bonding layer 42 is made of an adhesive, the assembly 10 can be strongly fixed to the bonding layer 42.

Although the bonding layer 42 may be formed immediately before the assembly 10 is placed thereon, the bottom plate portion 40 on which the bonding layer 42 is formed in advance may instead be used. In such a case, a sheet of release paper may be used to prevent foreign matter from adhering to the bonding layer 42 before the assembly 10 is placed on the bonding layer 42. Alternatively, the bonding layer 42 may instead be formed such that only the heat dissipation layer is formed in advance and only the adhesive layer is formed immediately before the assembly 10 is placed thereon.

[Arrangement of Side Wall Portion]

The side wall portion 41 to which the terminal hardware parts 8 are fixed is installed onto the bottom plate portion 40 from above the assembly 10 so that the side wall portion 41 surrounds the outer peripheral surface of the assembly 10. At this time, the side wall portion 41 is arranged so that the end portions 2*e* of the wire are placed in the respective U-shaped bonding portions 81*a* and 81*b*. Thus, the bonding portions 81*a* and 81*b* of the terminal hardware parts 8 may be used as guides. When the side wall portion 41 is arranged so as to cover the assembly 10 from above as described above, the overhanging portions of the side wall portion 41 cover the trapezoidal surfaces of the respective outer core portions 32 of the assembly 10 at one end of the outer core portions 32. The overhanging portions serve as stoppers by covering the outer core portions 32, and provide a function of positioning the side wall portion 41 relative to the assembly 10. The terminal hardware parts 8 may be fixed to the side wall portion 41 after the side wall portion 41 is arranged around the assembly 10.

[Assembly of Case]

The bottom plate portion 40 and the side wall portion 41 are integrated together with bolts (not shown) that are separately prepared. As a result of this step, as illustrated in FIG. 1, the case 4 is assembled into a box shape, and the assembly 10 is housed in the case 4. In addition, the end portions 2*e* of the wire are placed in the bonding portions 81*a* and 81*b*.

[Bonding of Terminal Hardware Parts to Wire]

The end portions 2*e* of the wire and the bonding portions 81*a* and 81*b* of the terminal hardware parts 8 are bonded together by welding, soldering, etc., so that they are electrically connected to each other. Either of the bonding of the terminal hardware parts 8 to the wire 2*w* and the arrangement of the temperature sensor 7, which will be described below, may be performed first.

[Arrangement of Temperature Sensor]

The temperature sensor 7 is placed in the trapezoidal space. In this example, the temperature sensor 7 is inserted into the space surrounded by the rounded corner portions 21 of the coil elements 2*a* and 2*b* at the top side and the sensor holder portion 54 of the insulator 5. The temperature sensor 7 is inserted into the space by using the end face of the partitioning portion 53*a* of the one segmented piece 50*a* of the insulator 5 as a stopper so that the axial direction of the temperature sensor 7 extends along the axial direction of the coil elements 2a and 2b. Accordingly, as illustrated in FIG. 5, the temperature sensor 7 is disposed in the trapezoidal space of the coil 2 (in this example, in particular, the space above the tangent line $l_c$) such that the temperature sensor 7 is surrounded by the rounded corner portions 21 of the coil elements 2a and 2b at the top side and the sensor holder portion 54.

Then, the wire 71 connected to the temperature sensor 7 is hooked onto the hook portion 55 of the insulator 5 and the hook portions 43 and 44 of the side wall portion 41 of the case 4. In this example, as illustrated in FIG. 1, the wire 71 is routed and hooked so as to extend from the bottom of the hook portion 55 ⇒ from bottom to top of the hook portion 43 ⇒ and from bottom to top of the hook portion 44. Since the wire 71 is hooked on the plurality of hook portions 55, 43, and 44, the position of the wire 71 can be reliably fixed. Therefore, the following advantages can be obtained. That is, (1) the temperature sensor 7 can also be reliably secured; and (2) it is not necessary to arrange the wire 71 such that the temperature sensor 7 receives an excessive bending force. As a result of the above-described steps, the reactor 1 that is not provided with the sealing resin is formed.

[Injection of Sealing Resin]

The sealing resin (not shown) is injected into the case 4 and cured, so that the reactor 1 having the sealing resin is formed. In this embodiment, the temperature sensor 7 and the wire 71 can also be secured by the sealing resin. In this embodiment, the bonding of the bonding portions 81a and 81b to the end portions 2e of the wire may be performed after the injection of the sealing resin.

<<Use>>

The reactor 1 having the above-described structure is suitable for use under electricity application conditions in which, for example, a maximum current (direct current) is about 100 A to 1000 A, an average voltage is about 100 V to 1000 V, and a working frequency is about 5 kHz to 100 kHz. Typically, the reactor 1 is suitable for use as a component of an on-vehicle power conversion device mounted in, for example, an electric vehicle or a hybrid electric vehicle.

<<Advantages>>

In the reactor 1 having the above-described structure, the coil 2 has a particular shape and the temperature sensor 7 is disposed in a particular region defined by the shape of the coil 2, that is, in the trapezoidal space formed by the rounded corner portions 21. Therefore, the stress applied to the temperature sensor 7 (stress applied as a result of thermal expansion of the coil 2) can be reduced or substantially eliminated. Therefore, the temperature sensor 7 can be prevented from being damaged by the above-described stress, and the reactor 1 is capable of appropriately measuring the temperature of the coil 2. In particular, the reactor 1 includes the insulator 5 having the sensor holder portion 54 that holds the temperature sensor 7 such that the temperature sensor 7 contacts the coil 2. This also allows appropriate measurement of the temperature of the coil 2. In addition, in the reactor 1, the gap g between the coil elements 2a and 2b is sufficiently smaller than the thickness of the temperature sensor 7. Therefore, the temperature sensor 7 is not disposed in an area in which the inner core portions 31 are disposed in the coil 2, but is disposed in a region in which the inner core portions 31 are not disposed (region above the tangent line $l_c$ in the trapezoidal space). This also makes the temperature sensor 7 of the reactor 1 to be not easily damaged by the above-described stress. Therefore, the reactor 1 is capable of performing an appropriate feedback control on the basis of the measured temperature.

In the reactor 1, the temperature sensor 7 is disposed in a region which is a so-called dead space and in which the above-described stress is not easily applied or is substantially not applied (region above the tangent line $l_c$ in the trapezoidal space). Therefore, the size of the reactor 1 is not increased owing to the installation or protection of the temperature sensor 7, and is small. In particular, in the reactor 1, the thickness of the partitioning portions 53a and 53b is smaller than the thickness of the temperature sensor 7. Therefore, the size of the reactor 1 is smaller than a reactor in which the temperature sensor 7 is disposed between the linear portions 22 of the coil elements 2a and 2b.

In addition, since the reactor 1 includes the insulator 5 having the hook portion 55 and the side wall portion 41 having the hook portions 43 and 44, movement of the wire 71 can be regulated. Therefore, even when the wire 71 has an excess length, the possibility that the wire 71 will be strongly pulled during manufacture or installation of the reactor 1 and the temperature sensor 7 connected to the wire 71 will be damaged can be reduced. In addition, the possibility that the wire 71 itself will be routed irregularly and become entangled can also be reduced. In particular, in the reactor 1, the wire 71 is hooked on the plurality of hook portions 43, 44, and 55, so that the wire 71 in the hooked state is not easily released or moved when the sealing resin is injected. Accordingly, the temperature sensor 7 is also not easily moved. This also allows the reactor 1 to appropriately measure the temperature of the coil 2. In addition, since the hook portions 43, 44, and 55 are formed integrally with the insulator 5 and the case 4 (side wall portion 41), the number of components is smaller than that in the case where the hook portions are formed as separate components. Furthermore, the hook portions 43, 44, and 55 can be easily formed by, for example, injection molding using a resin, so that the reactor 1 can be easily produced.

In addition, in the reactor 1, the bonding layer 42 including a heat dissipation layer having a high thermal conductivity of more than 2 W/m·K is interposed between the bottom plate portion 40 and the coil 2. Therefore, when the reactor 1 is used, the heat from the coil 2 and the magnetic core 3 can be efficiently transmitted to the fixation object, such as the cooling base, through the heat dissipation layer. Thus, the reactor 1 has a high heat dissipation performance. When the entire body of the bonding layer 42 is formed of an insulating material having a thermal conductivity of more than 2 W/m·K or when the thickness of the bonding layer 42 is reduced, the heat dissipation performance of the reactor can be further increased.

In addition, in the reactor 1, the bottom plate portion 40 with which the coil 2 is in contact is made of a material having a high thermal conductivity, such as aluminum or an aluminum alloy, so that the reactor 1 has a high heat dissipation performance. In addition, in the reactor 1, although the bottom plate portion 40 is made of a metal material (conductive material), at least a portion of the bonding layer 42 that is in contact with the coil 2 is made of an insulating material. Therefore, even when the bonding layer 42 has a thickness of about 0.1 mm and is very thin, an insulation can be provided between the coil 2 and the bottom plate portion 40. In particular, in this example, the entire body of the bonding layer 42 is made of an insulating material, so that a sufficient insulation can be provided between the coil 2 and the bottom plate portion 40. In addition, also because the bonding layer 42 is thin, the heat from, for example, the coil 2 can be easily transmitted to the fixation object through the bottom plate portion 40, and the reactor 1 has a high heat dissipation performance. Furthermore, in this example, the entire body of the bonding layer 42 is made of an insulating adhesive, so that the coil 2 and the magnetic core 3 can be tightly bonded to the bonding layer 42. This is another reason why the heat from, for example, the coil 2 can be easily transmitted to the bonding layer 42 and the reactor 1 has a high heat dissipation performance. In addition, in this example, a coated rectangular wire is used as the wire 2w, so that the contact area between the coil 2 and the bonding layer 42 is sufficiently large. This is another reason why the reactor 1 has a high heat dissipation performance.

Furthermore, since the reactor 1 includes the case 4, the assembly 10 can be provided with protection from the environment and mechanical protection. Although the case 4 is provided, since the side wall portion 41 is made of a resin, the reactor 1 is light. In addition, since the gap between the outer peripheral surface of the coil 2 and the inner peripheral surface of the side wall portion 41 can be reduced compared to that in the case where a side wall portion made of a conductive material is used, the reactor 1 is small. Also because the bonding layer 42 is thin as described above, the gap between the bottom surface 2d of the coil 2 and the inner surface of the bottom plate portion 40 can be reduced and the reactor 1 is small.

In addition, in the reactor 1, the bottom plate portion 40 and the side wall portion 41 are formed as separate components and are integrated together by using a fixing member. Therefore, the bonding layer 42 can be formed on the bottom plate portion 40 and the assembly 10 can be placed on the bottom plate portion 40 while the side wall portion 41 is removed. Thus, the formation of the bonding layer 42 and the installation of the assembly 10 can be easily performed, and the reactor 1 can be easily produced. In addition, since the bottom plate portion 40 and the side wall portion 41 are formed as separate components, they can be made of different materials. This increases the range of selection of materials of the case 4. In addition, since the insulator 5 is provided, the insulation between the coil 2 and the magnetic core 3 of the reactor 1 can be increased.

First Modification

Although the case is provided in the above-described first embodiment, the case may be omitted. In this modification, the size can be reduced since the case is not provided. In this modification, when the insulator 5 according to the first embodiment which includes the sensor holder portion 54 and the hook portion 55 is provided, the state in which the temperature sensor 7 is disposed at a predetermined position (in the trapezoidal space) on the assembly 10 can be easily maintained. In addition, when the outer periphery of the assembly 10 is covered with a resin by, for example, injection molding, the following advantages can be obtained. That is, (1) the temperature sensor 7 can be reliably secured in the trapezoidal space of the coil 2 by the resin so that the temperature sensor 7 is prevented from falling or being moved; (2) the assembly 10 can be provided with protection from the external environment and mechanical protection; and (3) the heat dissipation performance can be increased depending on the type of the resin. The above-described resin may be, for example, epoxy resin, unsaturated polyester, urethane resin, PPS resin, PBT resin, or ABS resin. When the resin contains the above-described filler, similar to the sealing resin, the heat dissipation performance can be increased.

Second Modification

Although the bottom plate portion 40 and the side wall portion 41 are made of different materials in the above-described first embodiment, they may instead be made of the same material. When, for example, they are made of a metal material having a high heat dissipation performance, such as aluminum, magnesium, or an alloy thereof, the heat dissipation performance of the reactor can be further increased. In particular, when the sealing resin is provided in this modification, the heat of the coil and the magnetic core can be efficiently transmitted to the case, and a high heat dissipation performance can be achieved. In addition, when an insulating resin is used as the sealing resin in this modification, the insulation between the outer peripheral surface of the coil and the inner peripheral surface of the side wall portion can be increased. Also in this modification, when the bonding layer includes an adhesive layer made of an insulating adhesive, an insulation can be provided between the coil and the bottom plate portion. In addition, when the bonding layer includes a heat dissipation layer made of a material having a thermal conductivity of 2 W/m·K or more, the gap between the coil and the bottom plate portion can be reduced so that the size can be reduced.

In this modification, to insulate the terminal hardware parts 8 from the side wall portion, an insulating coating may be provided on the surfaces of the terminal hardware parts 8 in regions other than around the bonding portions 81a and 81b and the through holes 82h. Also in this modification, the side wall portion of the case may be provided with the hook portions as in the first embodiment. However, when the insulator 5 having the hook portion 55 is provided as in the above-described first embodiment and the hook portions are not provided on the case, the side wall portion can be easily manufactured.

Third Modification

Although the bottom plate portion 40 and the side wall portion 41 of the case are formed as separate components in the above-described first embodiment, the bottom plate portion and the side wall portion may instead be formed integrally with each other. In this case, when the case is made of a metal material, the following advantages can be obtained: (1) a high heat dissipation performance can be achieved; and (2) the case has a high strength. When the case is made of an insulating material (typically a resin), the following advantages can be obtained: (I) a high insulation performance can be achieved; (II) the case is light; and (III) the case can be easily produced even when it has hook portions.

Fourth Modification

Figure 6:
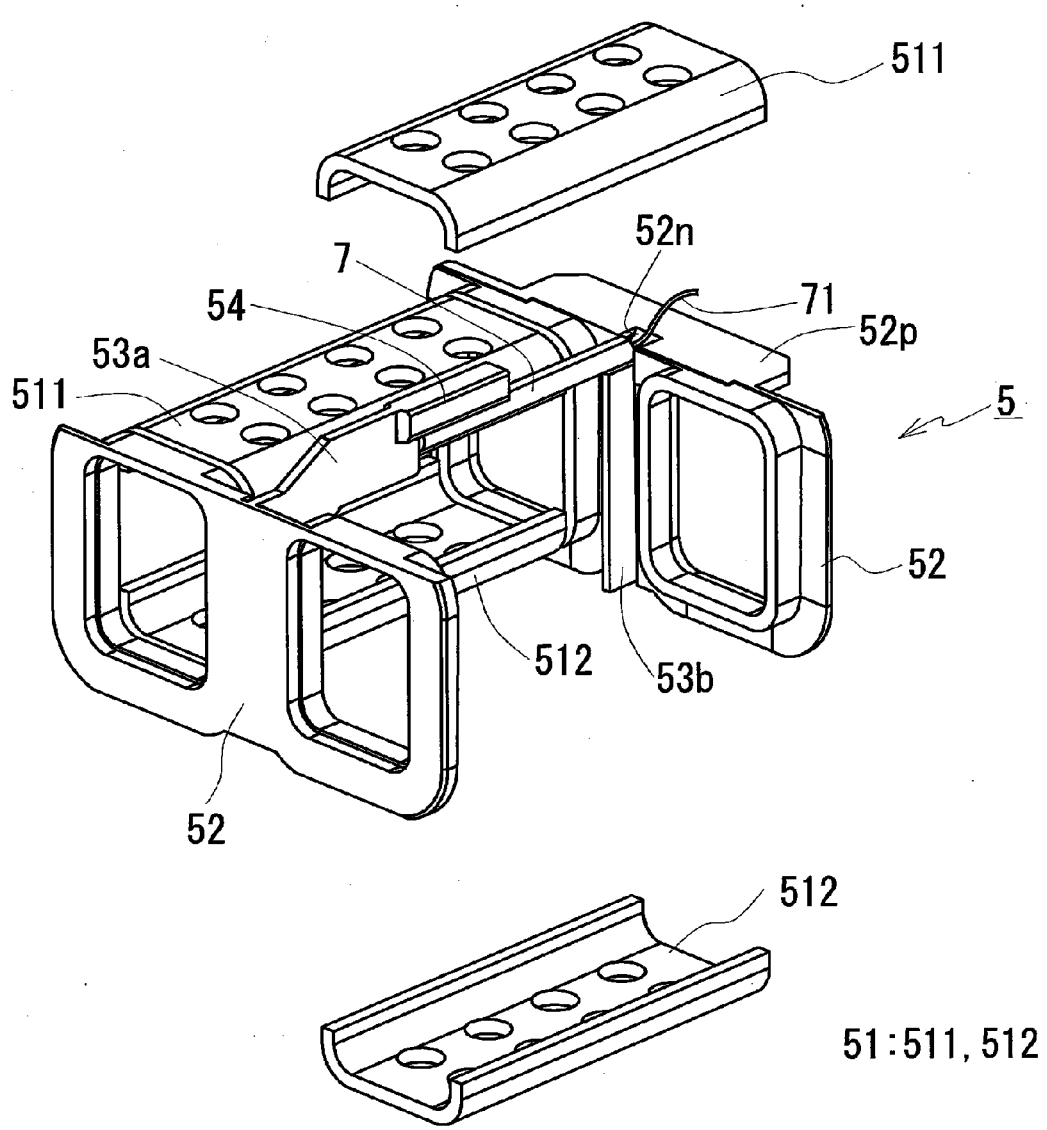
FIG. 6 is a perspective view of an insulator according to another embodiment.

According to the above-described first embodiment, the insulator 5 is formed of the pair of segmented pieces 50a and 50b that can be separated from each other in the axial direction of the coil 2. Alternatively, as illustrated in FIG. 6, the tubular portions 51 and the frame plate portions 52 may be formed as separate components. The insulator 5 illustrated in FIG. 6 includes a pair of tubular portions 51 to be arranged around the respective inner core portions and a pair of frame plate portions 52 arranged so as to sandwich the tubular portions 51.

Each of the tubular portions 51 illustrated in FIG. 6 is formed into a tubular shape by combining a pair of tube pieces 511 and 512 that are U-shaped in cross section and that can be separated from each other in a direction orthogonal to the axial direction of the coil. With this structure, the tube pieces 511 and 512 can be easily arranged at the outer periphery of the inner core portions, and thus the assembly can be facilitated. The other structures of the tubular portions may be similar to those of the tubular portions 51 of the above-described first embodiment. In the tubular portions 51 illustrated in FIG. 6, the tube pieces 511 and 512 are not engaged with each other, so that only parts of each inner core portion (mainly a pair of opposing surfaces) are covered by the tube pieces 511 and 512 and the other parts are exposed. In addition, the tube pieces 511 and 512 have holes that extend therethrough from the front side to the back side thereof, and the inner core portions are also partially exposed at these holes. Therefore, in the case where the insulator 5 illustrated in FIG. 6 and the sealing resin are provided, similar to the first embodiment, the contact area between the inner core portions and the sealing resin can be increased and air can be easily removed.

Similar to the first embodiment, each of the frame plate portions 52 illustrated in FIG. 6 is a B-shaped flat plate having a pair of openings. In addition, each of the frame plate portions 52 has short tubular portions that project therefrom at the side at which the coil is arranged. When the insulator 5 is assembled, the end faces of the tubular portions come into contact with end faces of the above-described tube pieces 511 and 512. Thus, the insulator 5 is provided so as to extend over the entire length of each inner core portion. An L-shaped partitioning portion 53a and a sensor holder portion 54 are provided between the short tubular portions of one frame plate portion 52 (left frame plate in FIG. 6), similar to the first embodiment. A band-shaped partitioning portion 53b and a base 52p are provided on the other frame plate portion 52 (right frame plate in FIG. 6), similar to the first embodiment. However, in this example, the other frame plate portion 52 is not provided with the hook portion 55 (FIG. 4). A corner portion between the band-shaped partitioning portion 53b and the flat plate-shaped base 52p is cut so as to form a cut portion 52n, and one end of the temperature sensor 7 (connecting end that is connected to the wire 71) is disposed in the cut portion 52n. One end portion of the temperature sensor 7 is in contact with the partitioning portion 53a of the one frame plate portion 52 and is pressed against the coil by the sensor holder portion 54. The other end portion of the temperature sensor 7 is fitted in the cut portion 52n and is supported by an end face of the partitioning portion 53b.

With the above-described structure, also in the insulator 5 illustrated in FIG. 6, the temperature sensor 7 can be appropriately supported in the trapezoidal space defined by the rounded corner portions of the coil elements at the top side. In particular, the temperature sensor 7 can be appropriately supported even when the temperature sensor 7 is long, as illustrated in FIG. 6. In this modification, a case having the hook portions 43 and 44 as in the first embodiment is preferably provided since movement of the wire 71 can be regulated.

Second Embodiment

The reactor according to the first embodiment or any of the first to fourth modifications may be used as, for example, a component of a converter mounted on a vehicle or the like, or a component of a power conversion device including the converter.

Figure 7:
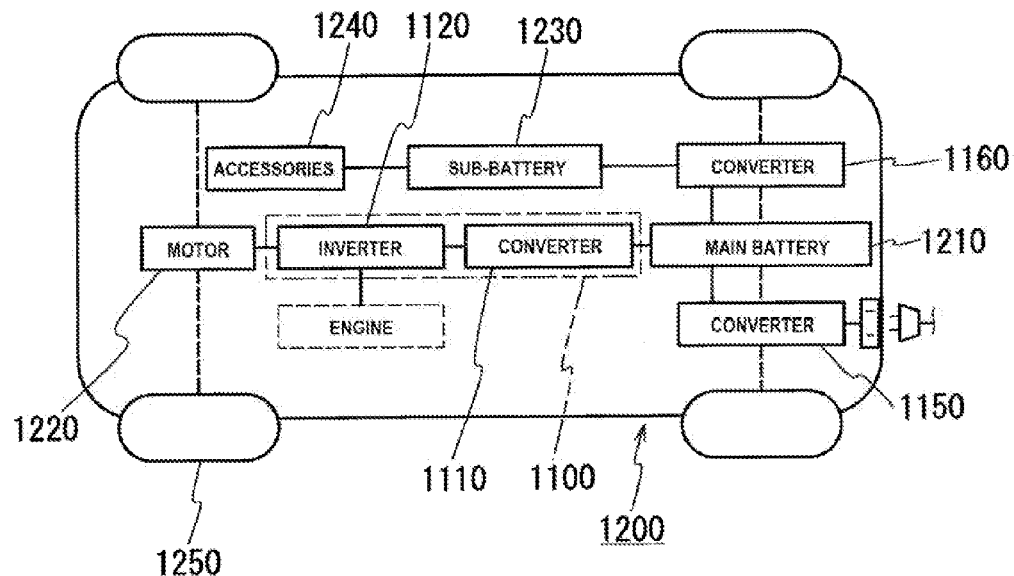
FIG. 7 is a schematic diagram illustrating a power system of a hybrid vehicle.

For example, as illustrated in FIG. 7, a vehicle 1200, which is a hybrid vehicle or an electric vehicle, includes a main battery 1210, a power conversion device 1100 connected to the main battery 1210, and a motor (load) 1220 driven by power supplied from the main battery 1210 and used to drive the vehicle 1200. The motor 1220 is typically a three-phase alternating current motor. The motor 1220 drives wheels 1250 when the vehicle 1200 is driven and functions as a generator during regeneration. In the case where the vehicle 1200 is a hybrid vehicle, the vehicle 1200 includes an engine in addition to the motor 1220. Although an inlet is illustrated in FIG. 7 as a charging portion of the vehicle 1200, a plug may instead be provided.

The power conversion device 1100 includes a converter 1110 connected to the main battery 1210, and an inverter 1120 that is connected to the converter 1110 and performs conversion between direct current and alternating current. While the vehicle 1200 is being driven, the converter 1110 of this example increases a direct-current voltage (input voltage) of the main battery 1210, which is about 200 V to 300 V, to about 400 V to 700 V, and supplies the increased voltage to the inverter 1120. In addition, during regeneration, the converter 1110 reduces a direct-current voltage (input voltage) output from the motor 1220 and input thereto through the inverter 1120 to a direct-current voltage suitable for the main battery 1210, and charges the main battery 1210. While the vehicle 1200 is being driven, the inverter 1120 converts the direct current whose voltage has been increased by the converter 1110 into predetermined alternating current and supplies the alternating current to the motor 1220. During regeneration, the inverter 1120 converts the alternating current output from the motor 1220 into direct current and outputs the direct current to the converter 1110.

Figure 8:
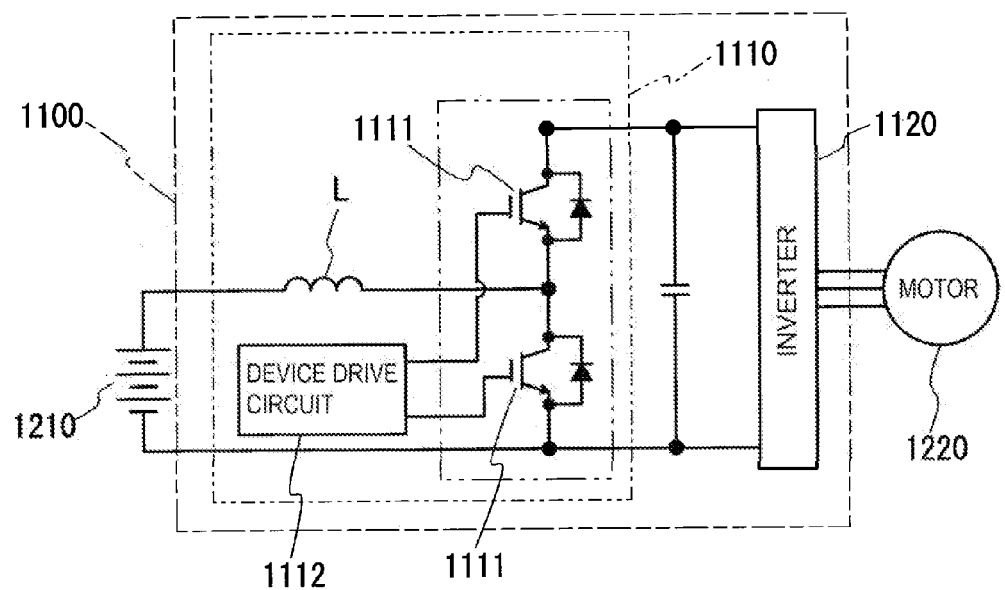
FIG. 8 is a schematic circuit diagram illustrating an example of a power conversion device of the present invention including a converter of the present invention.

As illustrated in FIG. 8, the converter 1110 includes a plurality of switching elements 1111, a drive circuit 1112 that controls the operation of the switching elements 1111, and a reactor L. The converter 1110 performs conversion of an input voltage (increases and reduces the input voltage in this example) by repeating an on/off operation (switching operation). A power device, such as an FET or an IGBT, is used as the switching element 1111. The reactor L uses characteristics of coils that the coils suppress a change in current that tries to flow through a circuit, and provide a function of making a current change smooth when current is increased or reduced by the switching operation. The reactor according to the first embodiment or any of the first to fourth modifications may be used as the reactor L. When the reactor 1 is provided, the temperature of the coil can be reliably measured by the temperature sensor, and the power conversion device 1100 and the converter 1110 can perform control operations based on the measurement result.

The vehicle 1200 includes, in addition to the converter 1110, a feeding device converter 1150 and an auxiliary power supply converter 1160. The feeding device converter 1150 is connected to the main battery 1210. The auxiliary power supply converter 1160 is connected to a sub-battery 1230, which serves as a power source for accessories 1240, and the main battery 1210, and converts a high voltage of the main battery 1210 into a low voltage. Although the converter 1110 typically performs DC-DC conversion, the feeding device converter 1150 and the auxiliary power supply converter 1160 perform AC-DC conversion. However, the feeding device converter 1150 may be of a kind that performs DC-DC conversion. A reactor which has the same structure as that of the reactor according to the first embodiment or any of the first to fourth modifications and whose size and shape are modified as appropriate may be used as the reactor included in the feeding device converter 1150 or the auxiliary power supply converter 1160. The reactor according to the first embodiment or any of the first to fourth modifications may also be used for a converter that performs conversion of input power and that only increases or reduces a voltage.

The present invention is not limited to the above-described embodiments, and various modifications may be made as appropriate without departing from the scope of the present invention.

INDUSTRIAL APPLICABILITY

The reactor according to the present invention is suitable for use as a component of a power conversion device, such as a DC-DC converter mounted in a vehicle, such as a hybrid vehicle, a plug-in hybrid vehicle, an electric vehicle, or a fuel cell vehicle, or a converter of an air conditioner.

REFERENCE SIGNS LIST 1 reactor 10 assembly
coil 2a, 2b coil element 2r coil connecting portion 2w wire
2e end portion of wire 2d bottom surface 2u top surface 21 rounded corner portion 22, 23 linear portion
3 magnetic core 31 inner core portion 31e end face 31m core piece 31g gap member
32 outer core portion 32e inner end face
4 case 40 bottom plate portion 41 side wall portion 42 bonding layer 43, 44, 45 hook portion
400, 411 attachment portion 400h, 411h bolt hole 410 terminal base 410c recessed groove
410p positioning projection
5 insulator 50a, 50b segmented piece 51 tubular portion 51a, 51b support portion
52 frame plate portion 52p base 52n cut portion 53a, 53b partitioning portion 54 sensor holder portion
55 hook portion 511, 512 tube piece
6 gasket
7 temperature sensor 7a thermosensitive element 7b protective portion 71 wire
8 terminal hardware part 81a, 81b bonding portion 82h through hole 83 positioning hole
9 terminal fixing member 91 bolt
1100 power conversion device 1110 converter 1111 switching element
1112 drive circuit L reactor 1120 inverter
1150 feeding device converter 1160 auxiliary power supply converter
1200 vehicle 1210 main battery 1220 motor 1230 sub-battery
1240 accessories 1250 wheel

The invention claimed is:

1. A reactor comprising a coil including a pair of coil elements and a magnetic core including a pair of inner core portions disposed in the respective coil elements and outer core portions that connect the inner core portions to form a closed magnetic circuit,
   wherein each of the coil elements is a tubular body formed by helically winding a wire and has an end face shape having a rounded corner portion, which is a corner portion that is rounded, the coil elements being arranged next to each other so that axes of the coil elements are parallel to each other, and
   wherein a temperature sensor is disposed in a trapezoidal space between the rounded corner portions of the coil elements that face each other and the temperature sensor is not disposed in a region between long linear portions of the coil elements that face each other.

2. The reactor according to claim 1, further comprising an insulator interposed between the coil and the magnetic core,
   wherein the insulator includes a sensor holder portion that projects toward the trapezoidal space and presses the temperature sensor against the coil so that the temperature sensor contacts the rounded corner portion.

3. The reactor according to claim 1, further comprising at least one hook portion on which a wire connected to the temperature sensor is hooked and a case that houses an assembly of the coil and the magnetic core,
   wherein at least one of the at least one hook portion is formed integrally with the case.

4. The reactor according to claim 1, further comprising an insulator interposed between the coil and the magnetic core and at least one hook portion on which a wire connected to the temperature sensor is hooked,
   wherein at least one of the at least one hook portion is formed integrally with the insulator.

5. The reactor according to claim 1, wherein the temperature sensor is disposed in a region of the trapezoidal space, the region being surrounded by the rounded corner portions and a tangent line of the inner core portions inserted through the respective coil elements.

6. A converter comprising a switching element, a drive circuit that controls an operation of the switching element, and a reactor that makes the switching operation smooth, the converter converting an input voltage by the operation of the switching element,
   wherein the reactor is the reactor according to claim 1.

7. A power conversion device comprising a converter that converts an input voltage, an inverter that is connected to the converter and performs conversion between a direct current and an alternating current, the power conversion device driving a load with electric power obtained as a result of the conversion performed by the inverter,
   wherein the converter is the converter according to claim 6.

8. The reactor according to claim 1, wherein a gap between the linear portions of the coil elements is smaller than the thickness of the temperature sensor.

* * * * *